(12) United States Patent
Shima

(10) Patent No.: US 10,165,287 B2
(45) Date of Patent: *Dec. 25, 2018

(54) IMAGE CODING APPARATUS, IMAGE CODING METHOD, IMAGE DECODING APPARATUS, IMAGE DECODING METHOD, AND STORAGE MEDIUM

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/360,459

(22) Filed: Nov. 23, 2016

(65) Prior Publication Data

US 2017/0078675 A1    Mar. 16, 2017

Related U.S. Application Data

(63) Continuation of application No. 14/356,556, filed as application No. PCT/JP2012/006784 on Oct. 23, 2012.

(30) Foreign Application Priority Data

Nov. 7, 2011    (JP) ................................ 2011-243942
Jan. 18, 2012   (JP) ................................ 2012-008199
(Continued)

(51) Int. Cl.
*H04N 19/18*    (2014.01)
*H04N 19/196*   (2014.01)
(Continued)

(52) U.S. Cl.
CPC ............. *H04N 19/18* (2014.11); *H04N 19/11* (2014.11); *H04N 19/126* (2014.11);
(Continued)

(58) Field of Classification Search
CPC .... H04N 19/11; H04N 19/126; H04N 19/129; H04N 19/162; H04N 19/167; H04N 19/18; H04N 19/196
See application file for complete search history.

(56) References Cited

U.S. PATENT DOCUMENTS 9,826,241 B2 * 11/2017 Shima ................. H04N 19/196
2008/0089421 A1  4/2008 Je-Chang et al.
(Continued)

FOREIGN PATENT DOCUMENTS

CN    1910922 A    2/2007
CN    1992904 A    7/2007
(Continued)

OTHER PUBLICATIONS

Sze, "CE11: Parallelization of HHI_TRANSFORM_CODING (Fixed Diagonal Scan from C227)", Joint Collaborative Team on Video Coding (JCT-VC) of ITU-T SG16 WP3 and ISO/IEC JTCI/SC29/WG11, 6th Meeting: Torino, IT, Jul. 14-22, 2011.
(Continued)

*Primary Examiner* — Behrooz M Senfi
(74) *Attorney, Agent, or Firm* — Canon USA, Inc. I.P. Division

(57) ABSTRACT

An image coding apparatus includes a block dividing unit configured to divide an input image into a plurality of blocks, a prediction unit configured to perform prediction based on coded pixels to generate prediction errors, a transformation unit configured to perform orthogonal transform to the prediction errors to generate transform coefficients, a quantization matrix generation unit configured to generate quantization matrices that are used to quantize the transform coefficients, a quantization matrix coding unit configured to calculate difference values by scanning the quantization matrices and to code the difference values, a quantization unit configured to generate quantization coefficients by quantizing the generated transform coefficients using the quantization matrices, and a coefficient coding unit configured to code the quantization coefficients, wherein the
(Continued)

quantization matrix coding unit is configured to scan coefficients of the quantization matrices in a unidirectional manner to calculate the difference value.

24 Claims, 23 Drawing Sheets

(30) Foreign Application Priority Data

Mar. 14, 2012 (JP) .................. 2012-057424
Apr. 16, 2012 (JP) .................. 2012-093113

(51) Int. Cl.
*H04N 19/129* (2014.01)
*H04N 19/11* (2014.01)
*H04N 19/463* (2014.01)
*H04N 19/126* (2014.01)
*H04N 19/167* (2014.01)
*H04N 19/162* (2014.01)

(52) U.S. Cl.
CPC ......... *H04N 19/129* (2014.11); *H04N 19/167* (2014.11); *H04N 19/196* (2014.11); *H04N 19/463* (2014.11); *H04N 19/162* (2014.11)

(56) References Cited

U.S. PATENT DOCUMENTS

| | | | |
|---|---|---|---|
| 2010/0195923 A1 | 8/2010 | Hallapuro et al. | |
| 2011/0222601 A1 | 9/2011 | Suzuki et al. | |
| 2013/0028530 A1* | 1/2013 | Drugeon | H04N 19/136 382/233 |
| 2013/0114709 A1* | 5/2013 | Shima | H04N 19/176 375/240.12 |
| 2014/0307782 A1* | 10/2014 | Shima | H04N 19/196 375/240.03 |

FOREIGN PATENT DOCUMENTS

| | | |
|---|---|---|
| JP | 2007-520948 A | 7/2007 |
| RU | 2565365 C2 | 10/2015 |
| WO | 2011/128303 A2 | 10/2011 |
| WO | 13/070766 A1 | 5/2013 |

OTHER PUBLICATIONS

Auyeung, "CE11: Cross checking of JCTVC-C227 and proposal on semantic, syntax, and implementation", Joint collaborative Team on Video Coding (JCT-VC) of ITU-T SG16 WP3 and ISO/IEC JTCI/SC29/WG11, 6th Meeting: Torino, IT, Jul. 14-22, 2011.

Zhao, et al., "CE11: Extended Mode Dependent Coefficient Scanning",Joint Collaborative Team on Video Coding (JCT-VC) of ITU-T SG16 WP3 and ISO/IEC JTCI/SC29/WG11, 7th Meeting: Geneva, CH, Nov. 21-30, 2011.

Yeo, et al., "Mode-Dependent Coefficient Scanning for Intra Prediction Residual Coding," Joint Collaborative Team on Video Coding (JCT-VC) of ITU-T SG16 WP3 and ISO/IEC JTC1/SC29/WG11, 4th Meeting, No. JCTVC-D049, Jan. 20-28, 2011, Institute for Infocomm Research, Korea.

Zheng, et al., "CE11: Mode Dependent Coefficient Scanning", Joint Collaborative Team on Video Coding (JCT-VC) of ITU-T SG16 WP3 and ISO/IEC JTC1/SC29/WG11 4th Meeting, No. JCTVC-D393, Jan. 2011.

Unichi Tanaka, et al., "Quantization Matrix for HEVC", Joint Collaborative Team on Video Coding (JCT-VC) of ITU-T SG16 WP3 and ISO/IEC JTC1/SC2/WG11, 5th Meeting, JCTVC-E073, Mar. 2011.

Sze, et al., "Parallelization of HHI_TRANSFORM_CODING" Joint Collaborative Team on Video Coding (JCT-VC) of ITU-T SG16 WP3 and ISO/IEO JTC1/SC29/WG11, 3rd Meeting, Guangzhou, CN, Oct. 7-14, 2010, pp. 1-11.

* cited by examiner

FIG. 5A

| VALUE TO BE CODED | BINARY CODE |
|---|---|
| ... | ... |
| −5 | 0001011 |
| −4 | 0001001 |
| −3 | 00111 |
| −2 | 00101 |
| −1 | 011 |
| 0 | 1 |
| 1 | 010 |
| 2 | 00100 |
| 3 | 00110 |
| 4 | 0001000 |
| 5 | 0001010 |
| ... | ... |

FIG. 5B

| VALUE TO BE CODED | BINARY CODE |
|---|---|
| ... | ... |
| −5 | 0001011 |
| −4 | 0001001 |
| −3 | 00111 |
| −2 | 0010 |
| −1 | 011 |
| 0 | 11 |
| 1 | 10 |
| 2 | 010 |
| 3 | 00110 |
| 4 | 0001000 |
| 5 | 0001010 |
| ... | ... |

| 6  | 7  | 10 | 13 |
|----|----|----|----|
| 8  | 8  | 11 | 14 |
| 9  | 9  | 11 | 15 |
| 11 | 12 | 12 | 16 |

| 6 | 7 | 8 | 9 | 8 | 10 | 13 | 11 | 9 | 11 | 12 | 11 | 14 | 15 | 12 | 16 |

| 6 | 8 | 9 | 11 | 7 | 8 | 9 | 12 | 10 | 11 | 11 | 12 | 13 | 14 | 15 | 16 |

| -2 | 1 | 1 | 1 | -1 | 2 | 3 | -2 | -2 | 2 | 1 | -1 | 3 | 1 | -3 | 4 |

| -2 | 2 | 1 | 2 | -4 | 1 | 1 | 3 | -2 | 1 | 0 | 1 | 1 | 1 | 1 | 1 |

FIG. 7

| ZIGZAG SCAN | | | VERTICAL SCAN | | |
|---|---|---|---|---|---|
| ELEMENT | DIFFERENCE VALUE | CODE | ELEMENT | DIFFERENCE VALUE | CODE |
| 6 | -2 | 00101 | 6 | -2 | 00101 |
| 7 | 1 | 010 | 8 | 2 | 00100 |
| 8 | 1 | 010 | 9 | 1 | 010 |
| 9 | 1 | 010 | 11 | 2 | 00100 |
| 8 | -1 | 011 | 7 | -4 | 0001001 |
| 10 | 2 | 00100 | 8 | 1 | 010 |
| 13 | 3 | 00110 | 9 | 1 | 010 |
| 11 | -2 | 00101 | 12 | 3 | 00110 |
| 9 | -2 | 00101 | 10 | -2 | 00101 |
| 11 | 2 | 00100 | 11 | 1 | 010 |
| 12 | 1 | 010 | 11 | 0 | 1 |
| 11 | -1 | 011 | 12 | 1 | 010 |
| 14 | 3 | 00110 | 13 | 1 | 010 |
| 15 | 1 | 010 | 14 | 1 | 010 |
| 12 | -3 | 00111 | 15 | 1 | 010 |
| 16 | 4 | 0001000 | 16 | 1 | 010 |
| TOTAL CODE LENGTH | | 68 BITS | TOTAL CODE LENGTH | | 60 BITS |

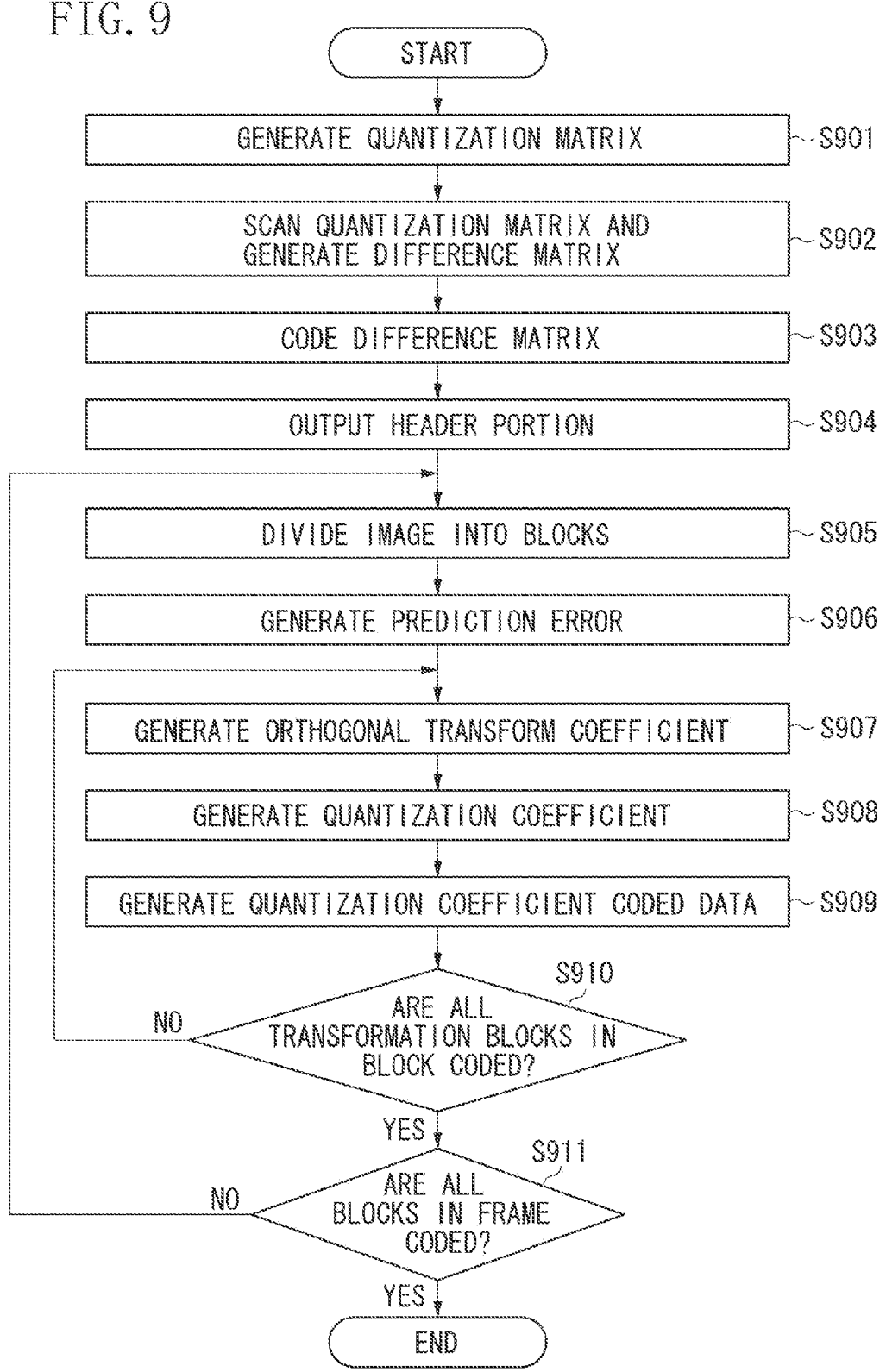

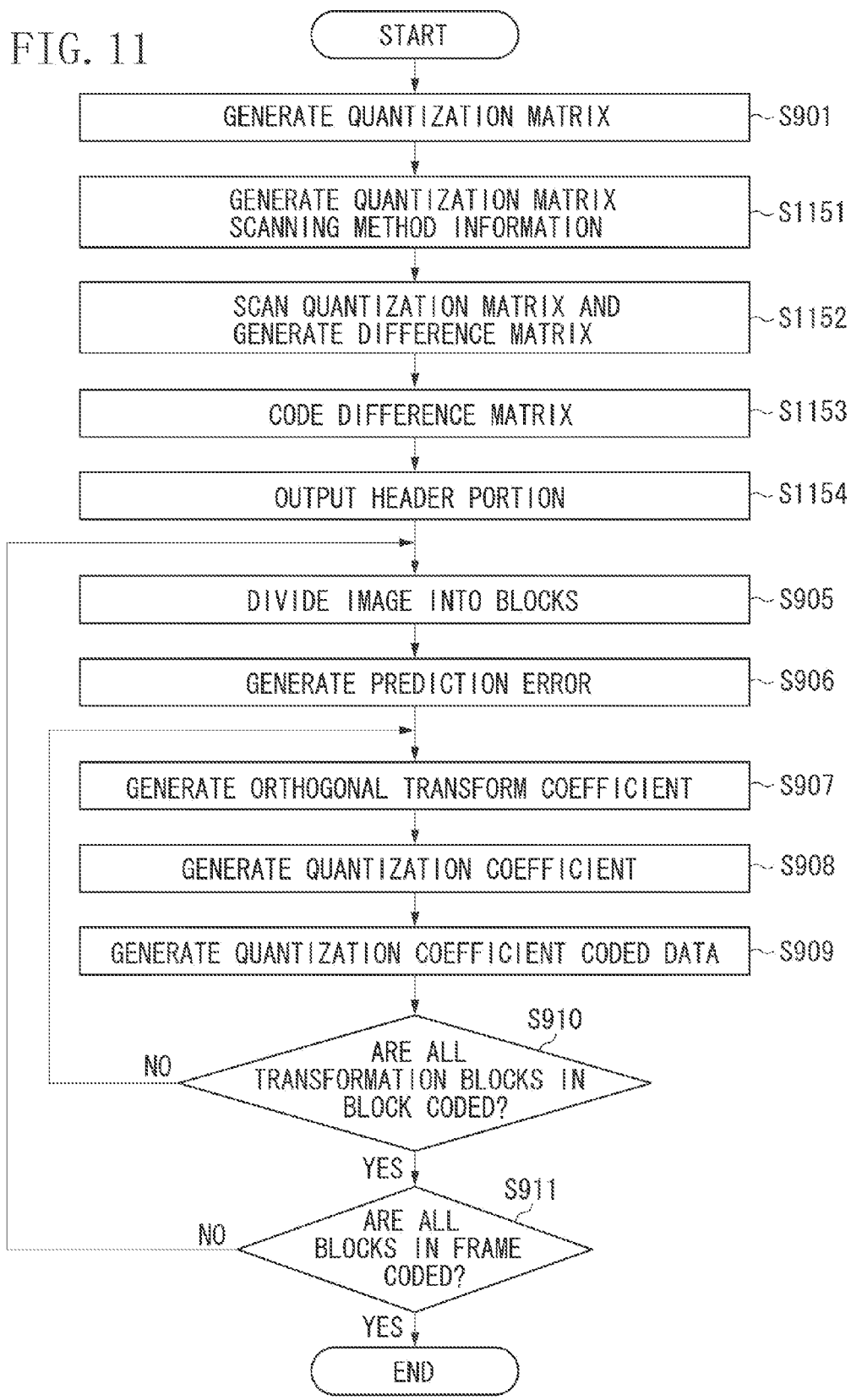

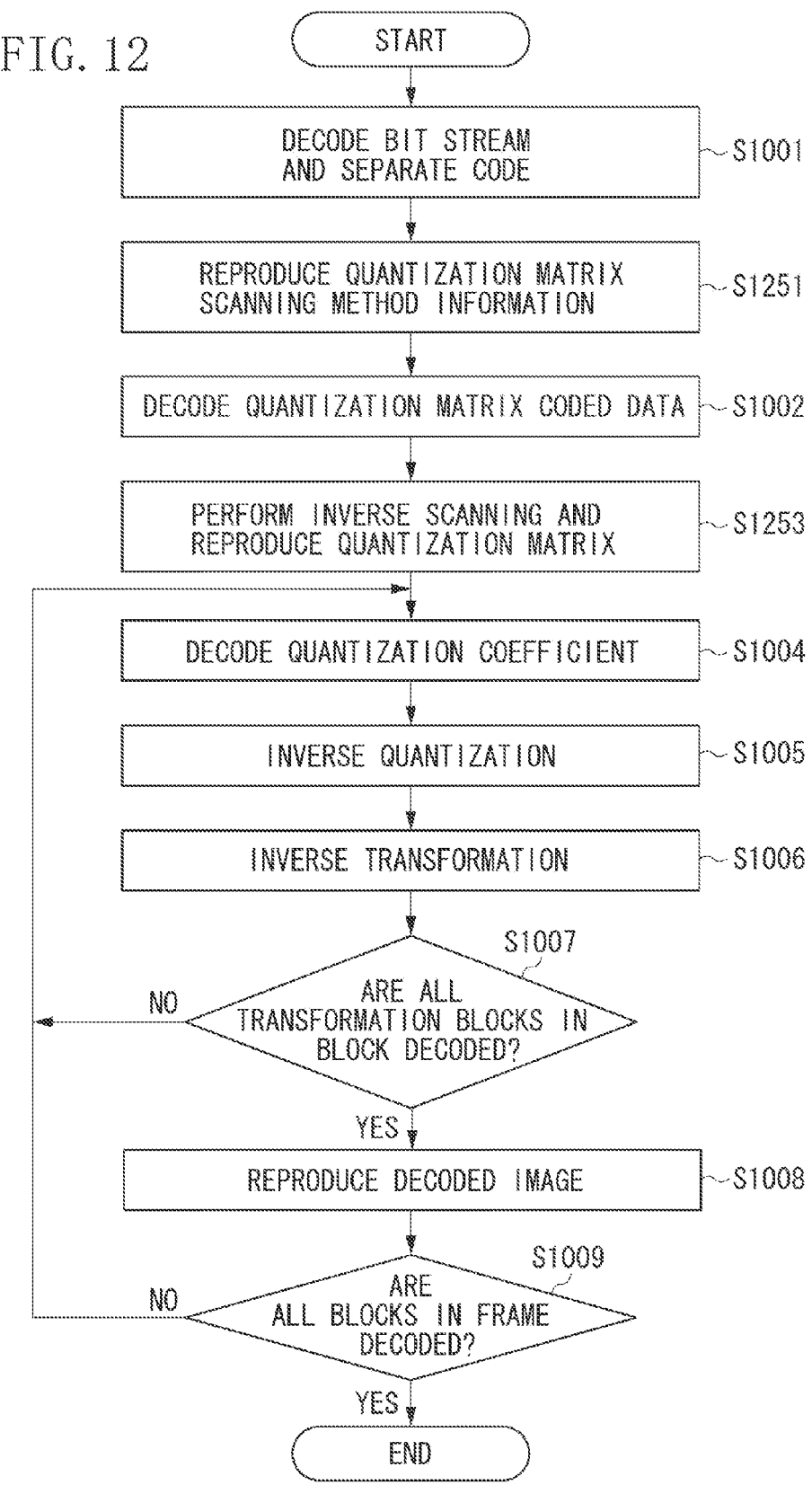

FIG. 15

| HORIZONTAL SCANNING OF DIFFERENCE VALUE BETWEEN INITIAL VALUE AND LARGEST VALUE OF UPPER OR LEFT ELEMENT ||
|---|---|
| DIFFERENCE VALUE | CODE |
| −2 | 00101 |
| 1 | 010 |
| 3 | 00110 |
| 3 | 00110 |
| 2 | 00100 |
| 0 | 1 |
| 1 | 010 |
| 1 | 010 |
| 1 | 010 |
| 0 | 1 |
| 0 | 1 |
| 1 | 010 |
| 2 | 00100 |
| 1 | 010 |
| 0 | 1 |
| 1 | 010 |
| TOTAL CODE LENGTH | 50 BITS |

FIG. 17A

| 6 | 7 | 10 | 13 |
|---|---|----|----|
| 8 | 8 | 11 | 14 |
| 9 | 9 | 11 | 15 |
| 11 | 12 | 12 | 16 |

FIG. 17B

| -2 | 1 | 3 | 3 |
|----|---|---|---|
| 2 | 0 | 1 | 1 |
| 1 | 0 | 0 | 1 |
| 2 | 1 | 0 | 1 |

FIG. 17C

| -2 | 1 | 3 | 3 | 2 | 0 | 1 | 1 | 1 | 0 | 0 | 1 | 2 | 1 | 0 | 1 |

FIG. 19A

| 6 | 7 | 10 | 13 |
|---|---|----|----|
| 8 | 8 | 11 | 14 |
| 9 | 9 | 11 | 15 |
| 11 | 12 | 12 | 16 |

FIG. 19B

| -2 | 2 | -1 | 2 | -1 | 2 | 1 | -2 | 2 | 2 | -1 | -1 | 3 | -2 | 3 | 1 |
|----|---|----|---|----|---|---|----|---|---|----|----|---|----|---|---|

IMAGE CODING APPARATUS, IMAGE CODING METHOD, IMAGE DECODING APPARATUS, IMAGE DECODING METHOD, AND STORAGE MEDIUM

CROSS-REFERENCE TO RELATED APPLICATIONS

This application is a continuation of U.S. patent application Ser. No. 14/356,556, presently pending and filed on May 6, 2014, that is a national phase application of international patent application PCT/JP2012/006784 filed on Oct. 23, 2012, which patent(s) and patent applications are hereby incorporated by reference herein in their entireties. This application also claims priority from Japanese Patent Applications No. 2011-243942 filed Nov. 7, 2011, Japanese Patent Applications No. 2012-008199 filed Jan. 18, 2012, Japanese Patent Applications No. 2012-057424 filed Mar. 14, 2012, and Japanese Patent Applications No. 2012-093113 filed Apr. 16, 2012, which are hereby incorporated by reference herein in their entireties.

TECHNICAL FIELD

The present invention relates to an image coding apparatus, an image coding method, an image decoding apparatus, an image decoding method, and a storage medium. More specifically, the present invention relates to a coding/decoding method of a quantization matrix in an image.

BACKGROUND ART

As a compression recording standard of a moving image, there is known H.264/MPEG-4 AVC (hereinafter referred to as H.264). (ITU-T H.264 (March 2010) Advanced video coding for generic audiovisual services) Regarding H.264, each element of a quantization matrix can be changed into an arbitrary value by coding scaling list information. According to chapter 7.3.2.1.1.1 of H.264, by adding a delta scale being a difference value between an element and its previous element, each element of the quantization matrix can take an arbitrary value.

Regarding H.264, elements of the quantization matrix are scanned in the direction from the element in the upper left corner of the two-dimensional quantization matrix, which corresponds to a low frequency component, to the element in the bottom right corner, which corresponds to a high frequency component. For example, in coding a two-dimensional quantization matrix illustrated in FIG. 6A, a scanning method called zigzag scanning illustrated in FIG. 13A is used. According to this processing, the quantization matrix is arranged into a one-dimensional matrix illustrated in FIG. 6B. Then, the difference between an element to be coded in the matrix and its previous element is calculated, and the matrix of the difference values illustrated in FIG. 6D is obtained. Further, the difference values are coded as a delta scale by a method called signed Exp-Golomb coding illustrated in FIG. 5A. For example, if the difference between an element in the matrix and its previous element is 0, a binary code 1 is coded. If the difference is −2, a binary code 00101 is coded.

However, regarding the zigzag scanning used in H.264, since elements of the quantization matrix are scanned in the diagonal direction, the amount of code of the quantization matrix is increased depending on the characteristics of the quantization matrix.

SUMMARY OF INVENTION

The present invention is directed to realizing high efficiency coding/decoding of quantization matrices by introducing a unidirectional scanning method such as horizontal/vertical scanning in the coding of quantization matrices.

According to an aspect of the present invention, an image coding apparatus includes block dividing means configured to divide an input image into a plurality of blocks, prediction means configured to perform prediction based on coded pixels to generate prediction errors, transformation means configured to perform orthogonal transform to the prediction errors to generate transform coefficients, quantization matrix generation means configured to generate quantization matrices that are used to quantize the transform coefficients, quantization matrix coding means configured to calculate difference values by scanning the quantization matrices and to code the difference values, quantization means configured to generate quantization coefficients by quantizing the generated transform coefficients using the quantization matrices, and coefficient coding means configured to code the quantization coefficients, wherein the quantization matrix coding means is configured to scan coefficients of the quantization matrices in a unidirectional manner to calculate the difference value.

According to an exemplary embodiment of the present invention, the amount of code necessary in coding quantization matrices can be reduced and high efficiency coding/decoding becomes possible.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 5A illustrates an example of a coding table of plus-minus symmetry.

FIG. 5B illustrates an example of a coding table of plus-minus asymmetry.

FIG. 6A illustrates an example of a quantization matrix.
FIG. 6B illustrates an example of a quantization matrix.
FIG. 6C illustrates an example of a quantization matrix.
FIG. 6D illustrates an example of a difference matrix.
FIG. 6E illustrates an example of a difference matrix.
FIG. 7 illustrates a coding example of a quantization matrix.

FIG. 9 is a flowchart illustrating image coding processing of the image coding apparatus according to the first, the fifth and the seventh exemplary embodiments.

FIG. 11 is a flowchart illustrating image coding processing of the image coding apparatus according to the third exemplary embodiment.

FIG. 12 is a flowchart illustrating image decoding processing of the image decoding apparatus according to the fourth exemplary embodiment.

FIG. 15 illustrates a coding example of a quantization matrix according to the fifth and the sixth exemplary embodiments.

FIG. 17A illustrates an example of a quantization matrix according to the fifth and the sixth exemplary embodiments.

FIG. 17B illustrates an example of a difference matrix according to the fifth and the sixth exemplary embodiments.

FIG. 17C illustrates an example of a difference matrix according to the fifth and the sixth exemplary embodiments.

FIG. 19A illustrates an example of a quantization matrix according to the seventh and the eighth exemplary embodiments.

FIG. 19B illustrates an example of a difference matrix according to the seventh and the eighth exemplary embodiments.

DESCRIPTION OF EMBODIMENTS

Various exemplary embodiments, features, and aspects of the invention will be described in detail below with reference to the drawings.

Figure 13A:
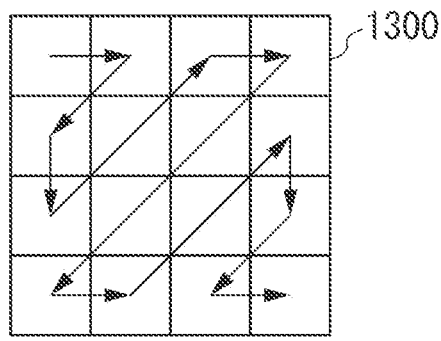
FIG. 13A illustrates an example of a scanning method and a difference calculation method of coefficients of a quantization matrix.
Figure 13B:
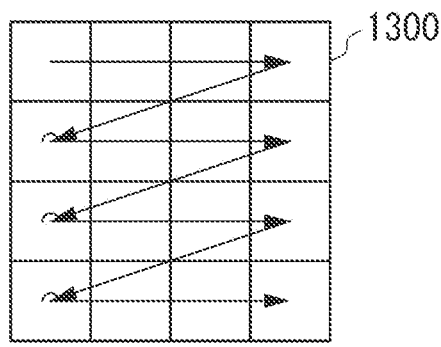
FIG. 13B illustrates an example of a scanning method and a difference calculation method of coefficients of a quantization matrix.
Figure 13C:
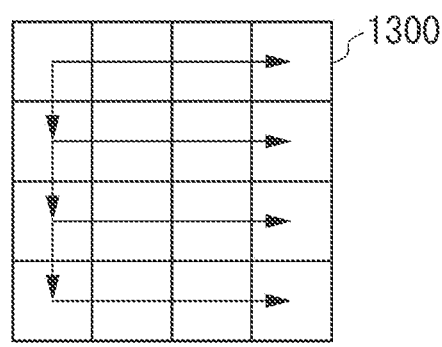
FIG. 13C illustrates an example of a scanning method and a difference calculation method of coefficients of a quantization matrix.
Figure 13D:
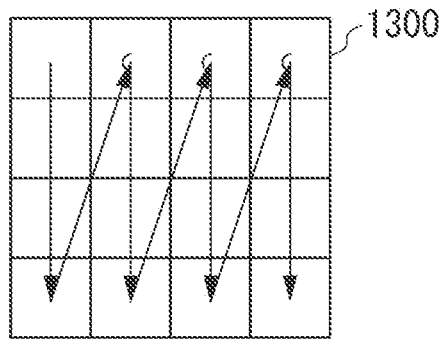
FIG. 13D illustrates an example of a scanning method and a difference calculation method of coefficients of a quantization matrix.

In the context of the present specification, a scanning method for a two-dimensional matrix illustrated in FIG. 13B is called horizontal scanning and a scanning method for a two-dimensional matrix illustrated in FIG. 13D is called vertical scanning.

Figure 1:
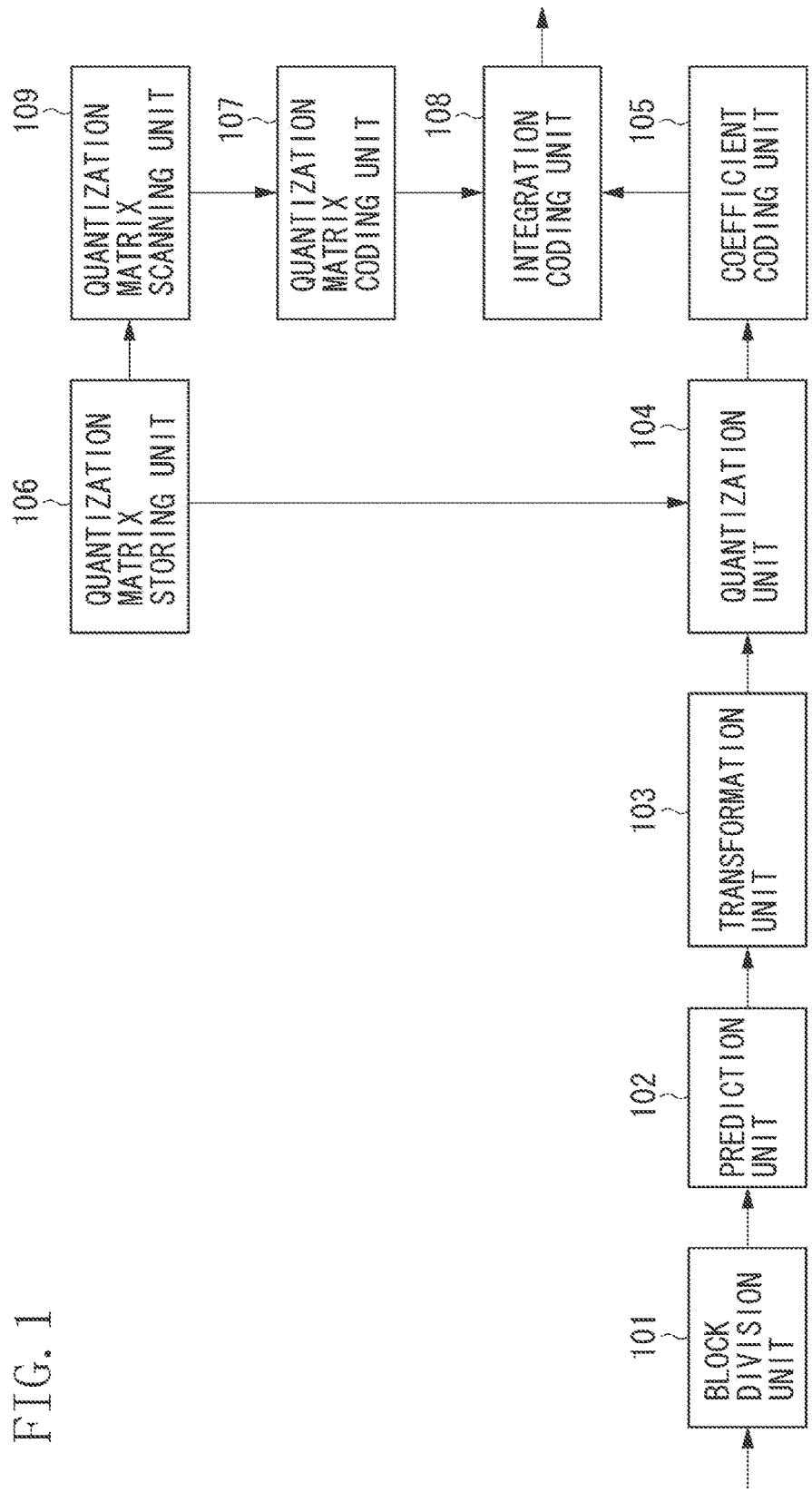
FIG. 1 is a block diagram illustrating a configuration of an image coding apparatus according to a first, a fifth, and a seventh exemplary embodiments of the present invention.

FIG. 1 is a block diagram illustrating an image coding apparatus according to a first exemplary embodiment of the present invention.

In FIG. 1, a block division unit 101 divides an input image into a plurality of blocks.

A prediction unit 102 performs prediction of each block divided by the block division unit 101 in block units, determines a prediction method, calculates difference values according to the determined prediction method, and further calculates prediction errors. If an intra frame of a moving image or a still image is to be processed, intra prediction is performed. If an inter frame of a moving image is to be processed, motion compensated prediction is performed as well as the intra prediction. The intra prediction is generally realized by selecting an optimum prediction method from a plurality of methods in calculating predicted values from data of neighboring pixels.

A transformation unit 103 performs orthogonal transform to the prediction errors of each block. The transformation unit 103 performs the orthogonal transform in units of blocks to calculate transform coefficients. The size of the block is the size of the input block or a size obtained by further segmenting the input block. In the following description, a block which is to be transformed by the orthogonal transform is called a transformation block. Although the method of the orthogonal transform is not limited, discrete cosine transform or Hadamard transform can be used. Further, according to the present embodiment, a prediction error in block units of 8×8 pixels is divided into two portions lengthwise and breadthwise and a resulting 4×4 pixel transformation block is used in the orthogonal transform to simplify the description. However, the size and the shape of the transformation block are not limited to such an example. For example, the orthogonal transform can be performed by using a transformation block of the same block size or a transformation block obtained by dividing the block into smaller portions than is obtained when the block is divided into two portions lengthwise and breadthwise.

A quantization matrix storing unit 106 generates and stores quantization matrices. The generation method of the quantization matrices which are stored in the quantization matrix storing unit 106 is not limited. Thus, it can be quantization matrices input by the user, quantization matrices calculated from characteristics of an input image, or quantization matrices designated in advance as initial values. According to the present embodiment, a two-dimensional quantization matrix corresponding to a transformation block of 4×4 pixels illustrated in FIG. 6A is generated and stored.

A quantization unit 104 quantizes the transform coefficients using the quantization matrices stored in the quantization matrix storing unit 106. Quantization coefficients are obtained by this quantization process.

A coefficient coding unit 105 codes the quantization coefficients obtained in this manner and generates quantization coefficient coded data. Although the coding method is not limited, coding such as Huffman coding and arithmetic coding can be used.

A quantization matrix scanning unit 109 scans the two-dimensional quantization matrices stored in the quantization matrix storing unit 106, calculates the difference of each element, and arranges it in one-dimensional matrices. According to the present exemplary embodiment, the difference arranged in this one-dimensional matrix is called a difference matrix.

A quantization matrix coding unit 107 codes the difference matrices (one-dimensional matrices) arranged by the quantization matrix scanning unit 109 and generates quantization matrix coded data. An integration coding unit 108 generates header information as well as codes which are associated with the prediction or transformation, and also integrates the quantization coefficient coded data generated by the coefficient coding unit 105 and the quantization matrix coded data generated by the quantization matrix coding unit 107. The code associated with the prediction or transformation is, for example, a code associated with the selection of the prediction method or the division of the transformation block.

The coding operation of an image performed by the above-described image coding apparatus will now be described. According to the present embodiment, although moving image data is input in frame units, still image data of one frame can also be input. Further, according to the present embodiment, in order to simplify the description, only the processing of intra prediction coding is described. However, the present invention can also be applied to processing of inter prediction coding. According to the present embodiment, although the block division unit 101 divides an input image into blocks of 8×8 pixels, the size of the blocks is not limited to such an example.

Next, coding of elements of the quantization matrices is performed before the coding of the image. First, the quantization matrix storing unit 106 generates the quantization matrices. The quantization matrices are determined according to the size of the block that is coded. The determination method of the element of the quantization matrices is not limited. For example, a predetermined initial value can be used or a value which is individually set can be used. Further, the value can be generated and set according to the characteristics of the image.

The quantization matrix generated in this manner is stored in the quantization matrix storing unit 106. FIG. 6A illustrates an example of a quantization matrix which corresponds to a transformation block of 4×4 pixels. A thick frame 600 represents the quantization matrix. In order to simplify the description, the quantization matrix has the size of 16 pixels that correspond to the transformation block of 4×4 pixels, and each cell of the matrix represents an element. According to the present embodiment, although the quantization matrix illustrated in FIG. 6A is stored in a two-dimensional matrix, elements in the quantization matrix are not limited to such an example. For example, if a transformation block of 8×8 pixels is to be used in addition to the block size of the present embodiment, a different quantization matrix that corresponds to the transformation block of 8×8 pixels needs to be stored.

Figure 13E:
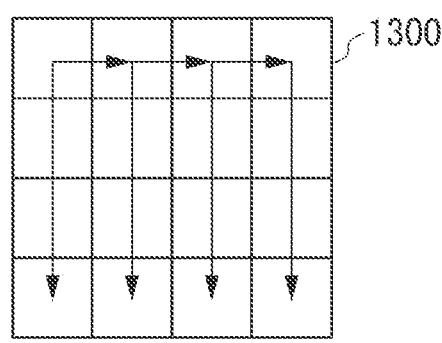
FIG. 13E illustrates an example of a scanning method and a difference calculation method of coefficients of a quantization matrix.

The quantization matrix scanning unit 109 reads out the two-dimensional quantization matrices stored in the quantization matrix storing unit 106 in order, scans each element, calculates the difference, and arranges the elements in one-dimensional matrices. According to the present embodiment, vertical scanning illustrated in FIG. 13D is used, and the difference between an element and its previous element is calculated for each element in the scanning order. However, the scanning method and the calculation method of the difference are not limited to such an example. The horizontal scanning illustrated in FIG. 13B can be used as the scanning method and the difference between an element and its previous element can be calculated for each element in the scanning order. Further, while using the scanning method illustrated in FIG. 13B, the difference regarding the elements on the left end can be calculated by obtaining a difference between the upper elements as illustrated in FIG. 13C. Thus, the difference between an element and its previous element is calculated as is performed in FIG. 13B except for the elements on the left end. Further, while using the scanning method illustrated in FIG. 13D, the difference regarding the elements on the top can be calculated by obtaining a difference between the left elements as illustrated in FIG. 13E. Thus, the difference between an element and its previous element is calculated as is performed in FIG. 13D except for the elements on the top. According to the present embodiment, the two-dimensional quantization matrix illustrated in FIG. 6A is scanned using the vertical scanning illustrated in FIG. 13D, and the difference between each element and its previous element is calculated, and the difference matrix illustrated in FIG. 6E is generated. Further, the difference value that corresponds to the first element of the matrix is obtained by calculating the difference between the value of the first element and a predetermined initial value. According to the present embodiment, although the initial value is set to 8, an arbitrary value can be used as the initial value or a value of the first element itself can be coded.

The quantization matrix coding unit 107 reads out the difference matrices from the quantization matrix scanning unit 109 in order, codes the difference matrices, and generates the quantization matrix coded data. According to the present embodiment, the difference matrices are coded by using a coding table illustrated in FIG. 5A. However, the coding table is not limited to such an example and, for example, a coding table illustrated in FIG. 5B can be used.

FIG. 7 illustrates an example of a result obtained by calculating the difference matrix of the quantization matrix illustrated in FIG. 6A using the scanning methods in FIGS. 13A and 13D and coding the difference matrix using the coding table illustrated in FIG. 5A. The columns of the element in FIG. 7 present the results obtained from scanning each element in the quantization matrix illustrated in FIG. 6A, and the columns of the difference value present the difference value between an element and the predetermined initial value 8 or the previous element. The columns of the code of the zigzag scanning present codes in a case where the zigzag scanning of the conventional method illustrated in FIG. 13A is used, and a total of 68 bits is necessary. On the other hand, columns of the code of the vertical scanning present codes in a case where the vertical scanning illustrated in FIG. 13D is used, and a total of 60 bits is necessary.

Thus, by employing the vertical scanning, the same quantization matrix can be coded with a smaller amount of code. The coded data of the quantization matrices generated in this manner is input to the integration coding unit 108. The integration coding unit 108 codes header information necessary in coding the image data, and integrates the coded data of the quantization matrices.

Next, coding of the image data is performed. When image data of one frame is input to the block division unit 101, it is divided into block units of 8×8 pixels. The divided image data is input to the prediction unit 102.

The prediction unit 102 performs the prediction in block units to generate prediction errors. The transformation unit 103 divides the prediction errors generated by the prediction unit 102 into blocks of a transformation block size and performs orthogonal transform to obtain transform coefficients. Then, the obtained transform coefficients are input to the quantization unit 104. According to the present embodiment, prediction errors in block units of 8×8 pixels is divided into transformation block units of 4×4 pixels to perform orthogonal transform.

Referring back again to FIG. 1, the quantization unit 104 quantizes the transform coefficients output from the transformation unit 103 by using the quantization matrices stored in the quantization matrix storing unit 106 and generates quantization coefficients. The generated quantization coefficients are input to the coefficient coding unit 105.

The coefficient coding unit 105 codes the quantization coefficients generated by the quantization unit 104, generates quantization coefficient coded data, and outputs the generated quantization coefficient coded data to the integration coding unit 108. The integration coding unit 108 generates codes associated with the prediction and transformation in block units, integrates the codes in block units and the quantization coefficient coded data generated by the coefficient coding unit 105 together with the coded data of the header, and generates a bit stream. Then, the integration coding unit 108 outputs the generated bit stream.

Figure 8A:
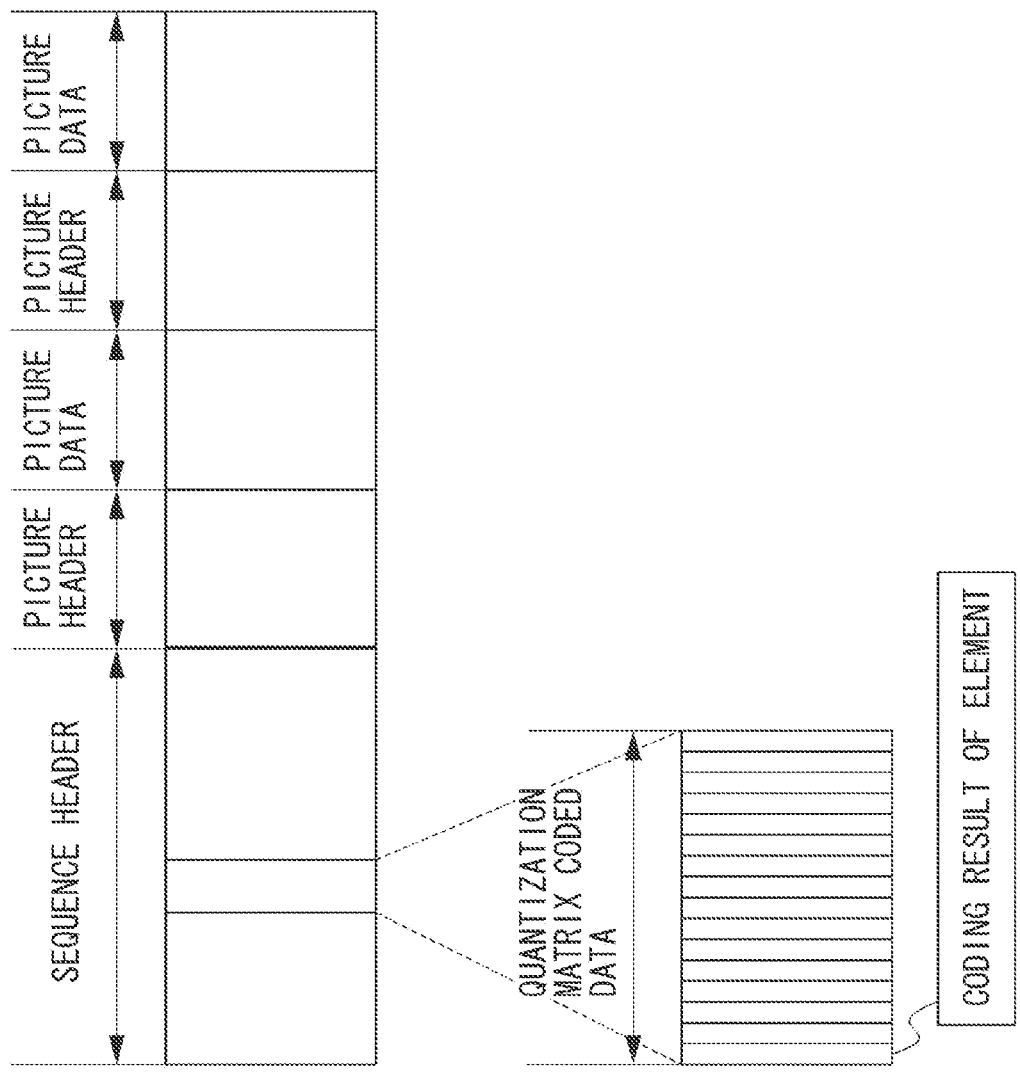
FIG. 8A illustrates an example of a bit stream structure.

FIG. 8A illustrates an example of a bit stream that is output according to the first exemplary embodiment. The sequence header includes the coded data of the quantization matrices and thus includes the results of the coding of each element. The position of the coded data, however, is not limited to such an example. For example, the coded data can be included in the picture header portion or other header portions. Further, if a change in the quantization matrix is to be performed in one sequence, the quantization matrix can be updated by newly coding the quantization matrix. In such a case, the entire quantization matrix can be rewritten. Further, if a scanning method and a transformation block size of the quantization matrix to be rewritten are designated, a portion of the quantization matrix can be changed according to the designation.

FIG. 9 is a flowchart illustrating the image coding processing performed by the image coding apparatus according to the first exemplary embodiment. In step S901, the quantization matrix storing unit 106 generates quantization matrices.

In step S902, the quantization matrix scanning unit 109 scans the quantization matrices generated in step S901, calculates the difference between elements, and generates difference matrices. According to the present embodiment, a quantization matrix illustrated in FIG. 6A is scanned using the scanning method illustrated in FIG. 13D, and a difference matrix illustrated in FIG. 6E is generated. However, the quantization matrices and the scanning method are not limited to such examples.

In step S903, the quantization matrix coding unit 107 codes the difference matrices generated in step S902. According to the present embodiment, the quantization matrix coding unit 107 codes the difference matrices illustrated in FIG. 6E using the coding table illustrated in FIG. 5A. However, the coding table is not limited to such a table.

In step S904, the integration coding unit 108 codes and outputs the header portion of the bit stream. In step S905, the block division unit 101 divides the input image in a unit of frame into a unit of block. In step S906, the prediction unit 102 performs prediction in block units and generates prediction errors.

In step S907, the transformation unit 103 divides the prediction errors generated in step S906 into blocks of a transformation block size, performs the orthogonal transform, and generates transform coefficients. In step S908, the quantization unit 104 generates quantization coefficients by quantizing the transform coefficients generated in step S907 using the quantization matrices generated in step S901 and stored in the quantization matrix storing unit 106.

In step S909, the coefficient coding unit 105 codes the quantization coefficients generated in step S908, and generates quantization coefficient coded data. In step S910, the image coding apparatus determines whether the coding of all the transformation blocks in the block is completed. If the coding of all the transformation blocks is completed (YES in step S910), the processing proceeds to step S911. If the coding of all the transformation blocks is not yet completed (NO in step S910), the processing returns to step S907 and the next transformation block is processed.

In step S911, the image coding apparatus determines whether the coding of all the blocks is completed. If the coding of all the blocks is completed (YES in step S911), the image coding apparatus stops all the operations and then the processing ends. If the coding of all the blocks is not yet completed (NO in step S911), the processing returns to step S905, and the next block is processed.

According to the above-described configuration and operation, especially, by the calculation processing of the difference matrix by the unidirectional scanning of the quantization matrix in step S902, a bit stream including a smaller amount of code of the quantization matrices can be generated.

According to the present embodiment, although a frame that uses only intra prediction is described, it is apparent that the present invention can be applied to a frame that can use inter prediction.

Further, according to the present embodiment, although a block of 8×8 pixels and a transformation block of 4×4 pixels are used, the present invention is not limited to such examples. For example, the block size can be 16×16 pixels or 32×32 pixels. Further, the shape of the block is not limited to a square and, for example, a rectangle of 16×8 pixels can be used.

Further, although the transformation block size is half of the block size lengthwise and breadthwise in the present embodiment, the transformation block size can be the same as the block size or further smaller than half the size of the block lengthwise and breadthwise.

Further, according to the present embodiment, the difference matrices are generated and then coded. However, the quantization matrix coding unit 107 can directly calculate the difference values from the quantization matrices using a predetermined scanning method and code the difference values. In such a case, the quantization matrix scanning unit 109 is not necessary.

Further, if different quantization matrices are to be used depending on the scanning method of the transform coefficients, the scanning method of elements of the quantization matrix can be determined according to the scanning method of the transform coefficients.

Further, according to the present embodiment, although a case with only one quantization matrix is described, the quantization matrix is not necessarily one. For example, if different quantization matrices are provided for luminance/chrominance, a common quantization matrix scanning method can be used or a different scanning method can be provided.

Figure 2:
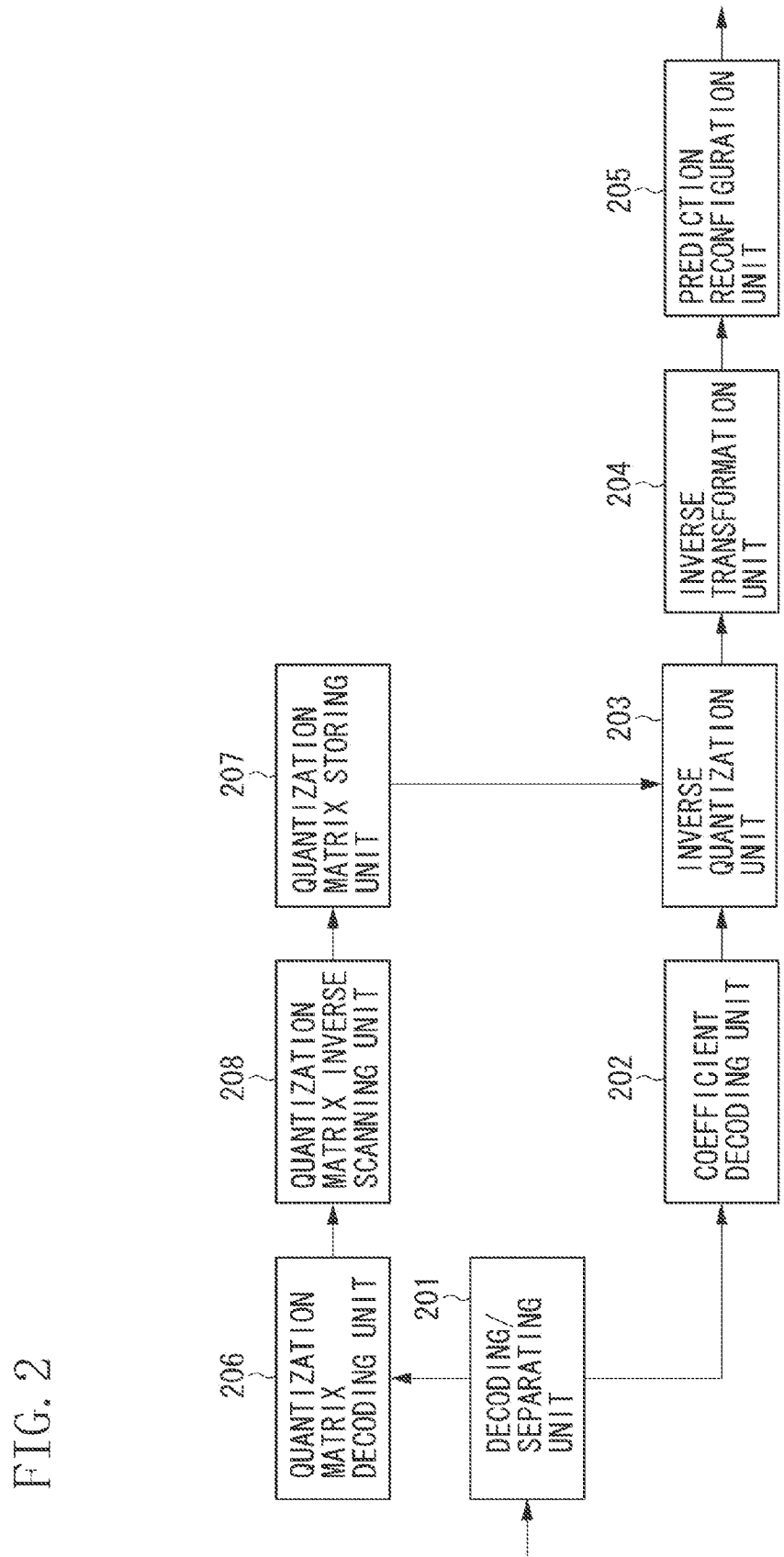
FIG. 2 is a block diagram illustrating a configuration of an image decoding apparatus according to a second, a sixth, and an eighth exemplary embodiments of the present invention.

FIG. 2 is a block diagram illustrating a configuration of an image decoding apparatus according to a second exemplary embodiment of the present invention. According to the present embodiment, decoding of the bit stream generated in the first exemplary embodiment will be described.

In FIG. 2, a decoding/separating unit 201 decodes the header information of the input bit stream, separates necessary codes from the bit stream, and outputs the separated codes to the subsequent stages. The decoding/separating unit 201 performs an inverse operation of the operation performed by the integration coding unit 108 illustrated in FIG. 1. A quantization matrix decoding unit 206 decodes the quantization matrix coded data from the header information of the bit stream and generates difference matrices.

A quantization matrix inverse scanning unit 208 reproduces quantization matrices by performing inverse scanning of the difference matrices generated by the quantization matrix decoding unit 206. The quantization matrix inverse scanning unit 208 performs an inverse operation of the operation performed by the quantization matrix scanning unit 109 illustrated in FIG. 1. A quantization matrix storing unit 207 stores the quantization matrices reproduced by the quantization matrix inverse scanning unit 208.

On the other hand, a coefficient decoding unit 202 decodes quantization coefficients from the code separated by the decoding/separating unit 201 and reproduces quantization coefficients. An inverse quantization unit 203 performs inverse quantization of the quantization coefficients by using the quantization matrices stored in the quantization matrix storing unit 207, and reproduces transform coefficients. An inverse transformation unit 204 performs inverse orthogonal transform, which is an inverse operation of the operation performed by the transformation unit 103 illustrated in FIG. 1, and reproduces prediction errors. A prediction reconfiguration unit 205 reproduces block image data from the reproduced prediction errors and neighboring image data already decoded.

The decoding operation of an image according to the above-described image decoding apparatus will now be described. According to the present embodiment, although a bit stream of a moving image generated in the first exemplary embodiment is input in the unit of frame, a bit stream of a still image of one frame can also be input. Further, according to the present embodiment, in order to simplify the description, only intra prediction decoding process is described. However, the present invention can also be applied to inter prediction decoding process.

Regarding the illustration in FIG. 2, a bit stream of one frame is input to the decoding/separating unit 201, and header information necessary in reproducing the image is decoded. Further, codes used in the subsequent stages are separated from the header information and output. The quantization matrix coded data included in the header information is input to the quantization matrix decoding unit 206 and one-dimensional difference matrices are reproduced.

According to the present embodiment, by using the decoding table illustrated in FIG. 5A, a difference value of each element of the quantization matrices is decoded and the difference matrices are reproduced. However, the decoding table is not limited to the table illustrated in FIG. 5A. The reproduced difference matrices are input to the quantization matrix inverse scanning unit 208.

The quantization matrix inverse scanning unit 208 calculates each element of the quantization matrices from each difference value in the input difference matrices, performs inverse scanning, and reproduces the two-dimensional quantization matrices. The reproduced quantization matrices are input to and stored in the quantization matrix storing unit 207. Further, out of the codes separated by the decoding/separating unit 201, the quantization coefficient coded data is input to the coefficient decoding unit 202. Further, the coefficient decoding unit 202 decodes the quantization coefficient coded data for each transformation block, reproduces the quantization coefficients, and outputs the reproduced quantization coefficients to the inverse quantization unit 203.

The inverse quantization unit 203 inputs the quantization coefficients reproduced by the coefficient decoding unit 202 and the quantization matrices stored in the quantization matrix storing unit 207. Then, the inverse quantization unit 203 performs inverse quantization by using the quantization matrices, reproduces the transform coefficients, and outputs the reproduced transform coefficients to the inverse transformation unit 204. The inverse transformation unit 204 performs the inverse orthogonal transform, which is an inverse operation of the operation performed by the transformation unit 103 illustrated in FIG. 1, by using the input transform coefficients, reproduces the prediction errors, and outputs the prediction errors to the prediction reconfiguration unit 205. The prediction reconfiguration unit 205 performs the prediction based on the input prediction errors and using the data of the neighboring decoding-finished pixels, reproduces the image data in block units, and outputs the image data.

Figure 10:
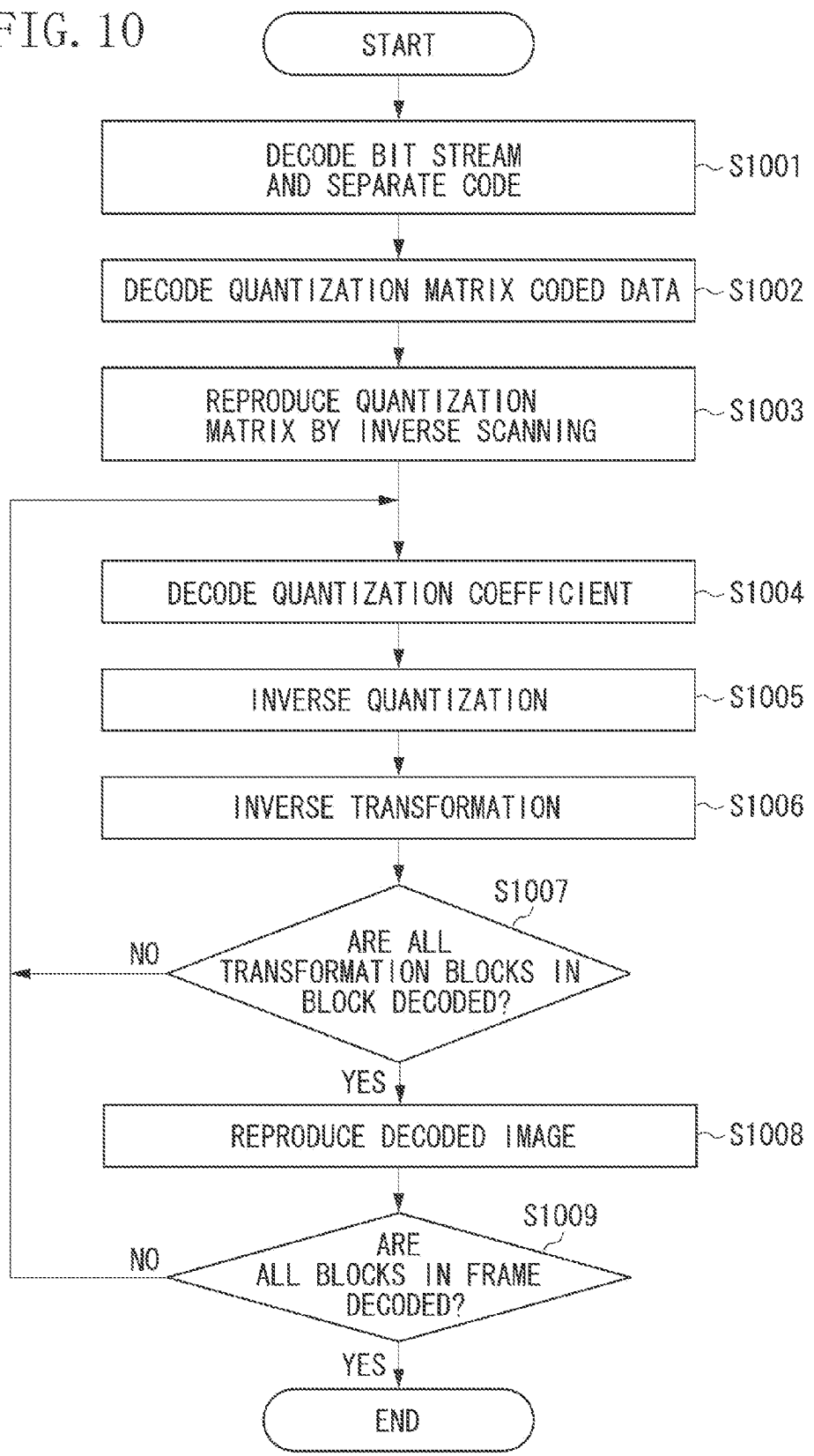
FIG. 10 is a flowchart illustrating image decoding processing of the image decoding apparatus according to the second, the sixth and the eighth exemplary embodiments.

FIG. 10 is a flowchart illustrating the image decoding processing of the image decoding apparatus according to the second exemplary embodiment.

In step S1001, the decoding/separating unit 201 decodes the header information and separates the codes to be output to the subsequent stages. In step S1002, the quantization matrix decoding unit 206 decodes the quantization matrix coded data included in the header information using the decoding table illustrated in FIG. 5A and generates difference matrices necessary in the quantization matrix reproduction. In step S1003, the quantization matrix inverse scanning unit 208 calculates each element of the quantization matrices from the difference matrices generated in step S1002, performs inverse scanning, and reproduces two-dimensional quantization matrices.

In step S1004, the coefficient decoding unit 202 decodes the quantization coefficient coded data in units of transformation blocks and reproduces quantization coefficients. In step S1005, the inverse quantization unit 203 performs inverse quantization to the quantization coefficients reproduced in step S1004 by using the quantization matrices reproduced in step S1003, and reproduces transform coefficients. In step S1006, the inverse transformation unit 204 performs the inverse orthogonal transformation to the transform coefficients reproduced in step S1005, and reproduces the prediction errors. In step S1007, the image decoding apparatus determines whether the decoding of all the transformation blocks in the block is completed. If the decoding of all the transformation blocks is completed (YES in step S1007), the processing proceeds to step S1008. If the decoding of all the transformation blocks is not yet completed (NO in step S1007), the processing returns to step S1004, and the next transformation block is processed.

In step S1008, the prediction reconfiguration unit 205 performs the prediction using the neighboring pixels already decoded, adds the result to the prediction errors reproduced in step S1006, and reproduces the decoded image of the block. In step S1009, the image decoding apparatus determines whether the decoding of all the blocks is completed. If the decoding of all the blocks is completed (YES in step S1009), all the operations are stopped and the processing ends. If the decoding of all the blocks is not yet completed (NO in step S1009), the processing returns to step S1003, and the next block is processed.

According to the above-described processing, decoding of the bit stream having a smaller amount of code of the quantization matrix generated according to the first exemplary embodiment is performed, and the reproduced image can be obtained. Further, as is described in the first exemplary embodiment, the size of the block, the size of the transformation block, and the shape of the block are not limited to the above-described examples.

Further, according to the present embodiment, the difference value of each element of the quantization matrix is decoded using the decoding table illustrated in FIG. 5A. However, the decoding table is not limited to such an example.

Further, if one sequence of a bit stream contains several quantization matrix coded data, the quantization matrices can be updated. In such a case, the decoding/separating unit 201 detects the quantization matrix coded data, decodes the quantization matrix coded data by the quantization matrix decoding unit 206, and generates difference matrices. The generated difference matrices are inversely scanned by the quantization matrix inverse scanning unit 208 and quantization matrices are reproduced. Then, corresponding data of the quantization matrices stored in the quantization matrix storing unit 207 is rewritten by the reproduced data of the quantization matrices. In such a case, the entire quantization matrix can be rewritten. Alternatively, a portion of the quantization matrix can be rewritten by determining the portion to be rewritten.

According to the present embodiment, although the processing is performed after the coded data of one frame is accumulated, the present invention is not limited to such an example. For example, the data can be input in a unit of block or in a unit of slice. A slice includes a plurality of blocks. Further, in place of blocks, data divided into packets of a fixed length can be input.

Further, according to the present embodiment, although the quantization matrix is reproduced after the difference matrix is generated, the quantization matrix decoding unit 206 can directly reproduce the quantization matrix by using a predetermined scanning method after decoding the difference value. In such a case, the quantization matrix inverse scanning unit 208 is not necessary.

Further, if different quantization matrices are to be used depending on the scanning method of the transform coefficients, the scanning method of elements of the quantization matrices can be determined according to the scanning method of the transform coefficients.

Figure 3:
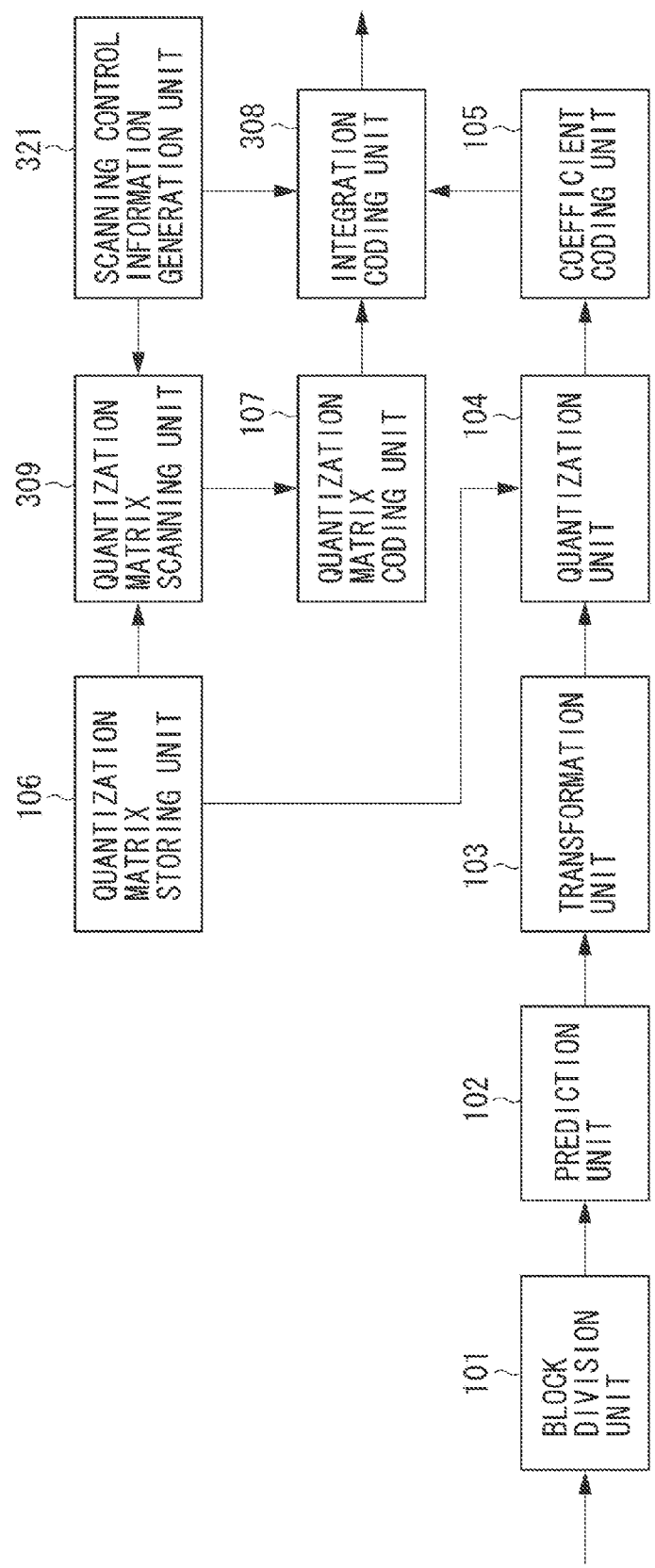
FIG. 3 is a block diagram illustrating a configuration of the image coding apparatus according to the third exemplary embodiment of the present invention.

FIG. 3 is a block diagram illustrating the image coding apparatus according to a third exemplary embodiment of the present invention. In FIG. 3, components similar to those in FIG. 1 of the first exemplary embodiment are denoted by the same reference numerals and their descriptions are not repeated.

A scanning control information generation unit 321 generates quantization matrix scanning method information, which is information of a scanning method of each quantization matrix. A quantization matrix scanning unit 309 determines the scanning method based on the quantization matrix scanning method information generated by the scanning control information generation unit 321, scans the quantization matrices stored in the quantization matrix storing unit 106, calculates difference values, and generates difference matrices.

An integration coding unit 308 generates header information and codes associated with the prediction and the transformation as is performed by the integration coding unit 108 in FIG. 1. The integration coding unit 308 is different from the integration coding unit 108 such that it inputs the quantization matrix scanning method information generated by the scanning control information generation unit 321 and codes it.

The image coding operation performed by the above-described image coding apparatus will now be described.

The scanning control information generation unit 321 generates the quantization matrix scanning method information, which indicates the scanning method of each quantization matrix and the calculation method of the difference value. According to the present embodiment, if the quantization matrix scanning method information is 0, the quantization matrix is scanned using the scanning method illustrated in FIG. 13A. Then, a difference value between an element and its previous element in the scanning order is calculated for all the elements, and the difference matrix is generated. Further, if the quantization matrix scanning method information is 1, the quantization matrix is scanned using the scanning method illustrated in FIG. 13B. Then, a difference value between an element and its previous element in the scanning order is calculated for all the elements, and the difference matrix is generated. Furthermore, if the quantization matrix scanning method information is 2, the quantization matrix is scanned using the scanning method illustrated in FIG. 13D. Then, a difference value between an element and its previous element in the scanning order is calculated for all the elements, and the difference matrix is generated. The scanning method of each element of the quantization matrix and the difference calculation method are not limited to the above-described examples, and methods other than those described with reference to FIGS. 13A, 13B, and 13D can be used. For example, the difference calculation methods illustrated in FIGS. 13C and 13E can be used. Further, the combination of the quantization matrix scanning method information and the scanning method of the quantization matrix is not limited to the above-described example. The generation method of the quantization matrix scanning method information is not limited. Thus, the information can be a value input by the user, a value designated as a fixed value, or a value calculated from the characteristics of the quantization matrices stored in the quantization matrix storing unit 106. The generated quantization matrix scanning method information is input to the quantization matrix scanning unit 309 and the integration coding unit 308.

Based on the quantization matrix scanning method information which has been input, the quantization matrix scanning unit 309 scans each quantization matrix stored in the quantization matrix storing unit 106, calculates a difference value, generates a difference matrix, and outputs the difference matrix to the quantization matrix coding unit 107.

Figure 8B:
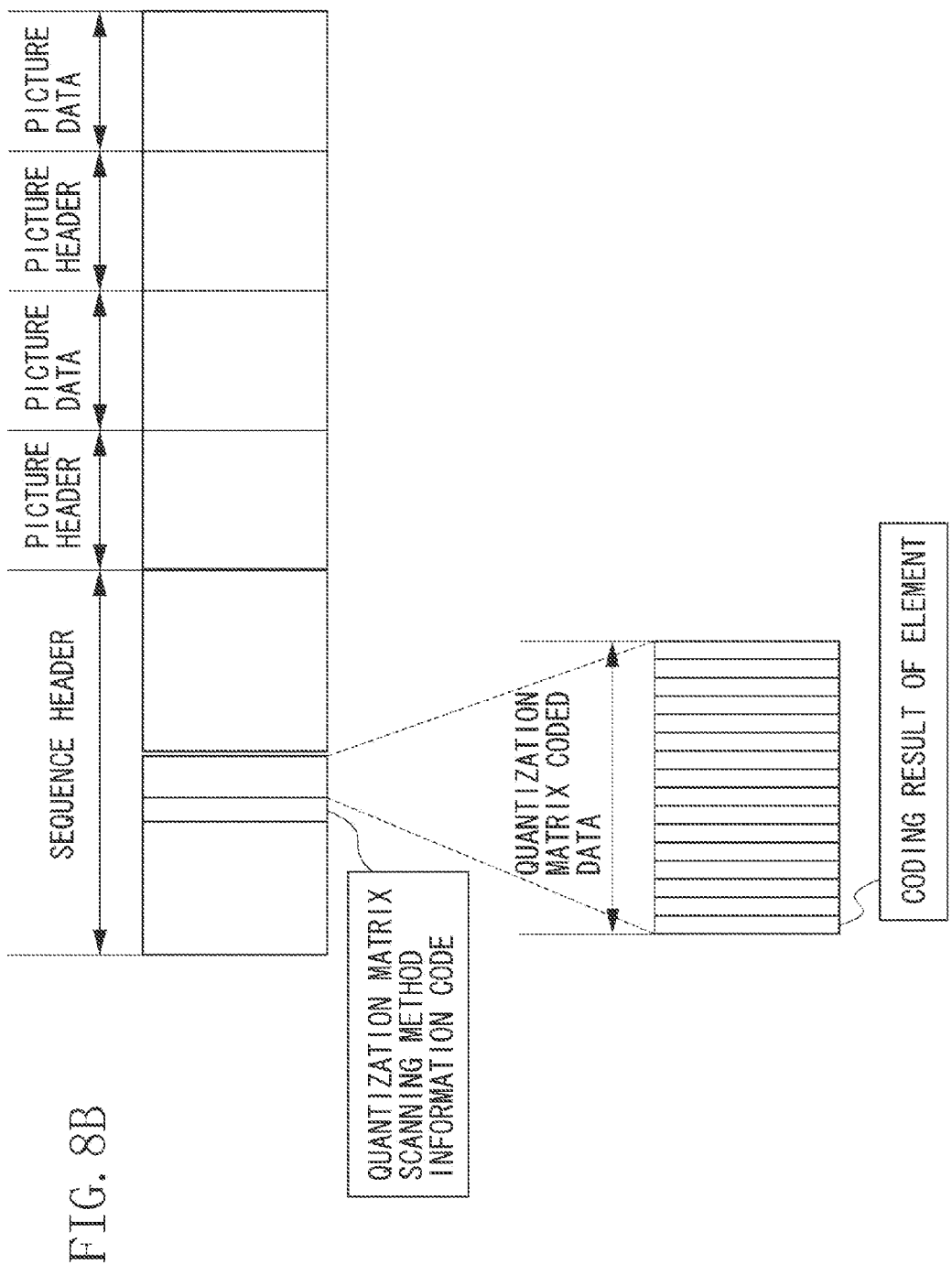
FIG. 8B illustrates an example of a bit stream structure.

The integration coding unit 308 codes the quantization matrix scanning method information generated by the scanning control information generation unit 321, generates a quantization matrix scanning method information code, and outputs the generated quantization matrix scanning method information code by implementing it in the header information. Although the coding method is not limited, Huffman coding and arithmetic coding can be used. FIG. 8B illustrates an example of a bit stream including the quantization matrix scanning method information code. The quantization matrix scanning method information code can be included in either the sequence header or the picture header. However, it needs to exist before each piece of quantization matrix coded data.

FIG. 11 is a flowchart illustrating the image coding processing of the image coding apparatus according to the third exemplary embodiment. In FIG. 11, components similar to those in FIG. 9 of the first exemplary embodiment are denoted by the same reference numerals and their descriptions are not repeated.

In step S1151, the scanning control information generation unit 321 determines the quantization matrix scanning method to be performed in step S1152 and generates quantization matrix scanning method information. In step S1152, the quantization matrix scanning unit 309 calculates the difference values by scanning the quantization matrices generated in step S901 by using the quantization matrix scanning method determined in step S1151, and generates difference matrices. In step S1153, the quantization matrix coding unit 107 codes the difference matrices generated in step S1152. In step S1154, the quantization matrix coding unit 107 codes the quantization matrix scanning method information, generates the quantization matrix scanning method information code, implements it in the header portion as other codes are implemented, and outputs the code.

According to the above-described configuration and operation, each quantization matrix is scanned by an optimum scanning method, and a bit stream with a smaller amount of code of the quantization matrix can be generated. Further, if different quantization matrices are to be used depending on the scanning method of the transform coefficients, the scanning method of elements of the quantization matrices can be determined according to the scanning method of the transform coefficients. If a different scanning method is to be used, a flag indicating such a method and quantization matrix scanning method information to be used can be coded.

Further, according to the present embodiment, although a case where one quantization matrix is used is described, the quantization matrix is not necessarily one. For example, if different quantization matrices are provided for luminance/chrominance, common coded information of a quantization matrix scanning method can be used or a different scanning method can be provided, coded, and used.

Further, the scanning control information generation unit 321 can generate the scanning method by referencing the quantization matrices generated by the quantization matrix storing unit 106. Further, as described above, if a plurality of scanning methods is prepared in advance, a desirable scanning method can be selected from the scanning methods and used as the quantization matrix scanning information. Furthermore, the order of the elements that are scanned can be coded. Regarding the quantization matrix in FIG. 13A, an order such as 1, 2, 6, 7, 3, 5, 8, 13, 4, 9, 12, 14, 10, 11, 15, 16 can be coded and transmitted.

Figure 4:
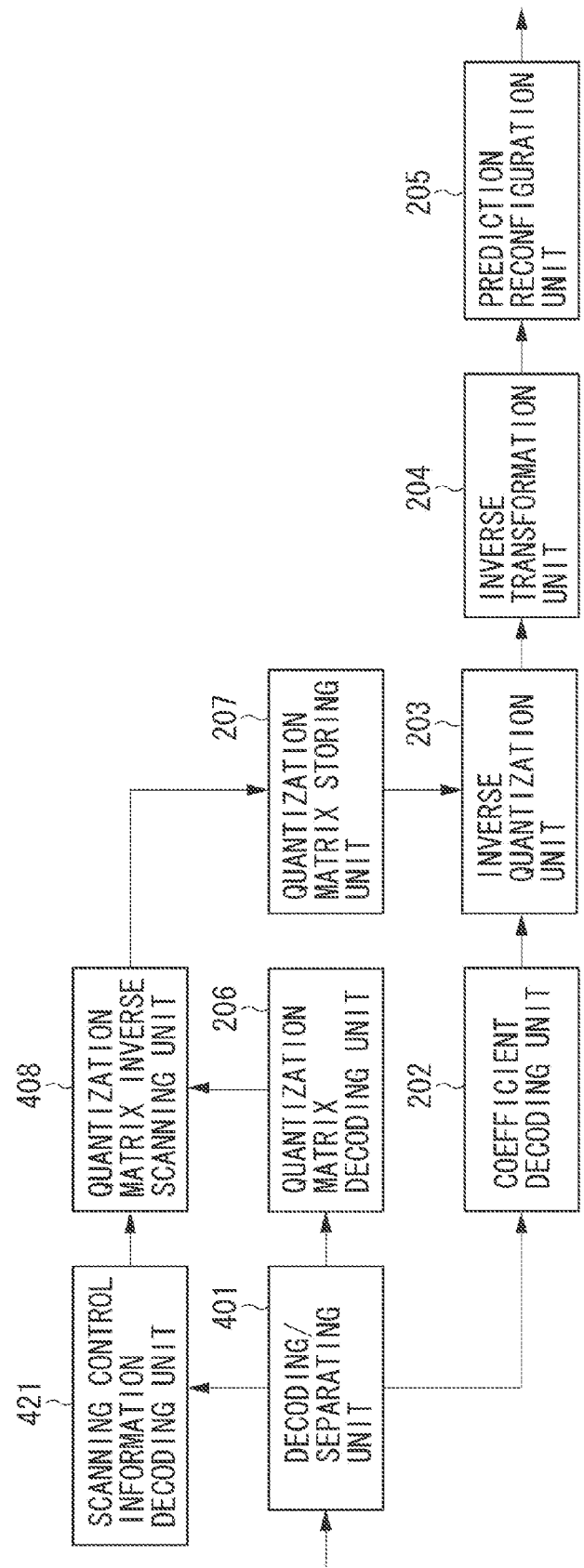
FIG. 4 is a block diagram illustrating a configuration of the image decoding apparatus according to the fourth exemplary embodiment of the present invention.

FIG. 4 is a block diagram illustrating the image decoding apparatus according to a fourth exemplary embodiment of the present invention. In FIG. 4, components similar to those in FIG. 2 of the second exemplary embodiment are denoted by the same reference numerals and their descriptions are not repeated. According to the present embodiment, decoding of the bit stream generated in the third exemplary embodiment will be described.

A decoding/separating unit 401 decodes header information of the bit stream which has been input, separates the necessary codes from the bit stream and outputs the codes to the subsequent stages. The decoding/separating unit 401 is different from the decoding/separating unit 201 illustrated in FIG. 2 in that the quantization matrix scanning method information code is separated from the header information of the bit stream and that it is output to the subsequent stage.

A scanning control information decoding unit 421 decodes the quantization matrix scanning method information code separated by the decoding/separating unit 401, and reproduces the quantization matrix scanning method information. A quantization matrix inverse scanning unit 408 reproduces the quantization matrices by performing inverse scanning of the difference matrices generated by the quantization matrix decoding unit 206 based on the quantization matrix scanning method information.

The image decoding operation of the above-described image decoding apparatus will now be described.

In FIG. 4, a input bit stream of one frame is input to the decoding/separating unit 401 and header information necessary in reproducing the image is decoded. Further, the codes used in the subsequent stages are separated and output. The quantization matrix scanning method information code included in the header information is input to the scanning control information decoding unit 421, and quantization matrix scanning method information is reproduced. Then, the reproduced quantization matrix scanning method information is input to the quantization matrix inverse scanning unit 408. On the other hand, the quantization matrix coded data included in the header information is input to the quantization matrix decoding unit 206.

The quantization matrix decoding unit 206 decodes the quantization matrix coded data and reproduces the difference matrices. The reproduced difference matrices are input to the quantization matrix inverse scanning unit 408. The quantization matrix inverse scanning unit 408 inversely scans the difference matrices input from the quantization matrix decoding unit 206 based on the quantization matrix scanning method information, adds the difference in units of elements, and reproduces the quantization matrices. The reproduced quantization matrices are stored in the quantization matrix storing unit 207.

FIG. 12 is a flowchart illustrating the image decoding processing of the image decoding apparatus according to the fourth exemplary embodiment. In FIG. 12, components similar to those in FIG. 10 of the second exemplary embodiment are denoted by the same reference numerals and their descriptions are not repeated.

In step S1001, the decoding/separating unit 401 decodes the header information. In step S1251, the scanning control information decoding unit 421 decodes the quantization matrix scanning method information code included in the header information, and reproduces the quantization matrix scanning method information. In step S1253, the quantization matrix inverse scanning unit 408 performs inverse scanning of the difference matrices reproduced in step S1252 by using the information of the scanning method of the quantization matrix reproduced in step S1251, and reproduces the quantization matrices.

According to the above-described configuration and operation, each quantization matrix generated according to the third exemplary embodiment is scanned by an optimum scanning method, and a bit stream with a smaller amount of code of the quantization matrix is decoded, and a reproduced image is obtained.

Further, if different quantization matrices are to be used depending on the scanning method of the orthogonal transform coefficient, the scanning method of elements of the quantization matrices can be determined according to the scanning method of the transform coefficients. If a different scanning method is to be used, a flag indicating such a method and quantization matrix scanning method information to be used can be coded.

According to a fifth exemplary embodiment of the present invention, the configuration of the image coding apparatus is similar to the image coding apparatus of the first exemplary embodiment illustrated in FIG. 1. However, the operation of the quantization matrix scanning unit 109 is different. Since, processing other than the processing of the quantization matrix scanning unit 109 is similar to that of the first exemplary embodiment, the description of such processing is not repeated.

The quantization matrix scanning unit 109 reads out the quantization matrices in a two-dimensional shape in order from the quantization matrix storing unit 106, calculates the difference between each element and its predicted value, scans the calculated difference, and arranges the obtained result in one-dimensional matrices. The calculation method of the difference is different from the method used by the quantization matrix scanning unit 109 of the first exemplary embodiment.

Figure 16A:
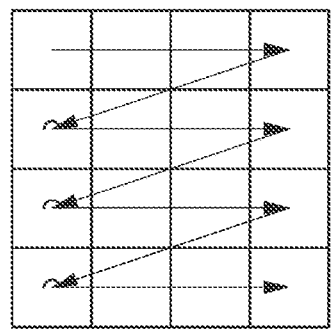
FIG. 16A illustrates an example of a scanning method and a difference calculation method of coefficients of a quantization matrix according to the fifth and the sixth exemplary embodiments.
Figure 16B:
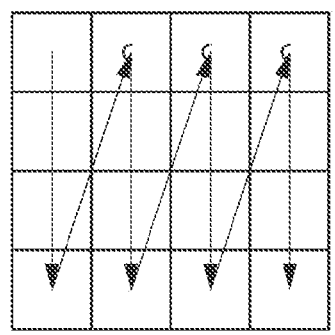
FIG. 16B illustrates an example of a scanning method and a difference calculation method of coefficients of a quantization matrix according to the fifth and the sixth exemplary embodiments.
Figure 16C:
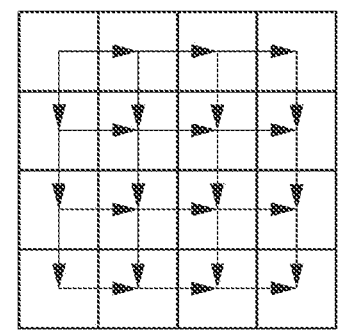
FIG. 16C illustrates an example of a scanning method and a difference calculation method of coefficients of a quantization matrix according to the fifth and the sixth exemplary embodiments.

According to the present embodiment, as illustrated in FIG. 16C, a predicted value is calculated by referencing the left and upper elements, and the calculated predicted value is scanned by horizontal scanning illustrated in FIG. 16A. Then, the obtained result is arranged in a one-dimensional matrix. Regarding the calculation method of the predicted value, although the element with a larger value out of the left and the upper elements is used as the predicted value according to the present embodiment, the present invention is not limited to such an example. For example, the smaller value can be used as the predicted value or a mean value of the two elements can be used as the predicted value. Regarding the coding of the elements in the first row of the matrix, the left element is considered as the predicted value. Further, regarding the coding of the elements in the leftmost column of the matrix, the upper element is considered as the predicted value. Further, the difference value that corresponds to the first element of the matrix is obtained by calculating the difference between the value of the first element and a predetermined initial value. According to the present embodiment, although the initial value is set to 8, an arbitrary value can be used or a value of the first element itself can be used. Further, the scanning method is not limited to the horizontal scanning. In other words, a different scanning method, such as the vertical scanning illustrated in FIG. 16B, can be used so long as it is a unidirectional scanning method.

The flowchart of the image coding process according to the present embodiment is similar to the flowchart according to the first exemplary embodiment illustrated in FIG. 9 except for the operation in step S902. Since operations other than what is performed in step S902 are similar to those described in the first exemplary embodiment, their descriptions are not repeated.

In step S902, the quantization matrix scanning unit 109 calculates the difference of each element of the quantization matrices generated in step S901, scans the difference which has been calculated, and generates difference matrices. The present embodiment describes a case where the quantization matrix illustrated in FIG. 17A is generated in step S901. A two-dimensional difference value matrix illustrated in FIG. 17B is calculated using the largest value out of the upper and the left elements of the generated quantization matrix illustrated in FIG. 16C as the predicted value. Then, the obtained difference value matrix is scanned by horizontal scanning illustrated in FIG. 16A, and the difference matrix illustrated in FIG. 17C is generated. If the upper and the left elements are used, the value which is used for the difference value calculation method is not limited to the largest value, and the smallest value or a mean value can also be used. Further, the scanning method is not limited to the horizontal scanning and a different scanning method can be used so long as it is a unidirectional scanning method.

FIG. 15 is a table obtained by calculating the difference values of the quantization matrix illustrated in FIG. 17A by using the largest value of the upper and the left elements as a predicted value as illustrated in FIG. 16C, scanning the difference value by using the scanning method illustrated in FIG. 16A, and coding it using the coding table illustrated in FIG. 5A. The column of the difference value in FIG. 15 shows a result obtained by scanning the difference value between the predicted value and each element horizontally, where the predicted value is a predetermined initial value (8) or a largest value of the left and the upper elements. The values in this table are the same as those of the difference matrix illustrated in FIG. 17C. The column of the code in FIG. 15 shows a code obtained by the coding of the difference value using the coding table in FIG. 5A, and a total of 50 bits is necessary. This indicates that the quantization matrix can be coded with less than 68 bits necessary in the conventional method illustrated in FIG. 7. Further, it is further less than the 60 bits required in the first exemplary embodiment.

According to the above-described configuration and operation, a bit stream which requires much less bits for the quantization matrices can be generated.

According to the present embodiment, although the predicted value is calculated by using the left and the upper elements, the predicted value can also be calculated, for example, by using an upper left element alternatively. Furthermore, an element other than such elements can also be used. In such a case, in addition to the largest, the smallest, and the mean values, a median value can also be used alternatively.

According to a sixth exemplary embodiment of the present invention, the image decoding apparatus has a configuration similar to the image decoding apparatus of the second exemplary embodiment illustrated in FIG. 2. However, the operation of the quantization matrix inverse scanning unit 208 is different. Since, the processing of the present embodiment is similar to that of the second exemplary embodiment except for the operation performed by the quantization matrix inverse scanning unit 208, the description of similar processing is not repeated. According to the present embodiment, decoding of the bit stream generated according to the fifth exemplary embodiment will be described.

The quantization matrix inverse scanning unit 208 performs an inverse operation of the quantization matrix scanning unit 109 according to the fifth exemplary embodiment. The difference matrices input to the quantization matrix inverse scanning unit 208 have each of the difference values inversely scanned and two-dimensional difference value matrices are reproduced. Further, each element of the quantization matrices is calculated and two-dimensional quantization matrices are reproduced. According to the present embodiment, the difference matrices are inversely scanned using the horizontal scanning illustrated in FIG. 16A and two-dimensional difference value matrices are reproduced. Further, each element of the quantization matrices is calculated from the left and the upper element and the difference value as illustrated in FIG. 16C, and two-dimensional quantization matrices are reproduced. The method for the inverse scanning is not limited to the horizontal scanning, and a vertical scanning illustrated in FIG. 16B can also be used. In other words, any scanning method can be used so long as it is a unidirectional scanning method. As for the calculation method of each element of the quantization matrices, according to the present embodiment, the element with a larger value out of the left and the upper elements is determined as the predicted value, and the sum of the predicted value and the difference value is considered as the value of each element of the quantization matrices. However, the predicted value of each element is not limited to such a value. For example, a smaller value out of the left and the upper elements or a mean value of the two elements can be employed as the predicted value. Then, a sum of the predicted value and the difference value is determined as the value of each element of the quantization matrices. Further, regarding the reproduction of the elements at the top row of the matrix, their left element is used as the predicted value. Furthermore, regarding the reproduction of the elements at the left end of the matrix, their upper element is used as the predicted value. Then, a sum of the predicted value and the difference value is determined as the value of each element. Further, regarding the reproduction of the first element of the matrix, the predetermined initial value is used as the predicted value. Then, a sum of the predicted value and the difference value is determined as the value of the first element of the matrix. According to the present embodiment, although the initial value is set to 8, an arbitrary value can be used as the initial value or a value of the first element itself can be coded. Further, the scanning method is not limited to the horizontal scanning. In other words, a different scanning method, such as the vertical scanning illustrated in FIG. 16B, can be used so long as it is a unidirectional scanning method.

The flowchart of the image decoding processing according to the present embodiment is similar to the flowchart of the second exemplary embodiment illustrated in FIG. 10 except for the operation in step S1003. Thus, operations other than step S1003 are similar to those of the second exemplary embodiment and their descriptions are not repeated.

In step S1003, the quantization matrix inverse scanning unit 208 reproduces two-dimensional difference value matrices by performing inverse scanning of each difference value obtained from the difference matrices generated in step S1002. Further, two-dimensional quantization matrices are reproduced by calculation of each element of the quantization matrices. According to the present embodiment, the difference matrix illustrated in FIG. 17C is used in describing this processing. The difference matrix is inversely scanned by the horizontal scanning illustrated in FIG. 16A, and a two-dimensional difference value matrix illustrated in FIG. 17B is calculated. Then, a larger value out of the upper and the left elements is determined as the predicted value. Further a sum of each predicted value and each difference value is set as the value of each element of the quantization matrix. The inverse scanning method is not limited to the horizontal scanning so long as it is a unidirectional inverse scanning method. Further, an element of a smaller value out of the left and the upper elements or a mean value of the elements can be used as the predicted value alternatively in obtaining the value of each element used for the reproduction of each element of the quantization matrix.

According to the above-described configuration and operation, a reproduced image can be obtained by decoding the bit stream with a smaller amount of code of the quantization matrix generated according to the fifth exemplary embodiment.

According to the present embodiment, although the predicted value is calculated by using the left and the upper elements, the predicted value can also be calculated, for example, by using an upper left element alternatively. Furthermore, an element other than such elements can also be used. In such a case, in addition to the largest, the smallest, and the mean values, a median value can also be used alternatively.

According to a seventh exemplary embodiment of the present invention, the configuration of the image coding apparatus is similar to the image coding apparatus of the first exemplary embodiment illustrated in FIG. 1. However, the operation of the quantization matrix scanning unit 109 is different. Since, processing other than the processing of the quantization matrix scanning unit 109 is similar to that of the first exemplary embodiment, the description of such processing is not repeated.

The quantization matrix scanning unit 109 reads out the quantization matrices in two-dimensional shape in order from the quantization matrix storing unit 106, calculates the difference between each element and the predicted value, scans the calculated differences, and arranges the obtained result in one-dimensional matrices. The calculation method of the difference values is different from the method used by the quantization matrix scanning unit 109 of the first exemplary embodiment.

Figure 18A:
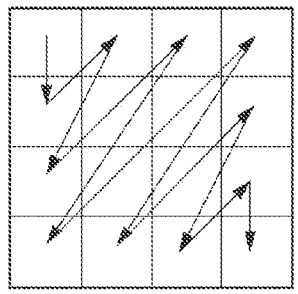
FIG. 18A illustrates an example of a scanning method of coefficients of a quantization matrix according to a seventh and the eighth exemplary embodiments.
Figure 18B:
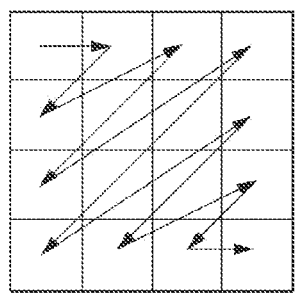
FIG. 18B illustrates an example of a scanning method of coefficients of a quantization matrix according to the seventh and the eighth exemplary embodiments.
Figure 18C:
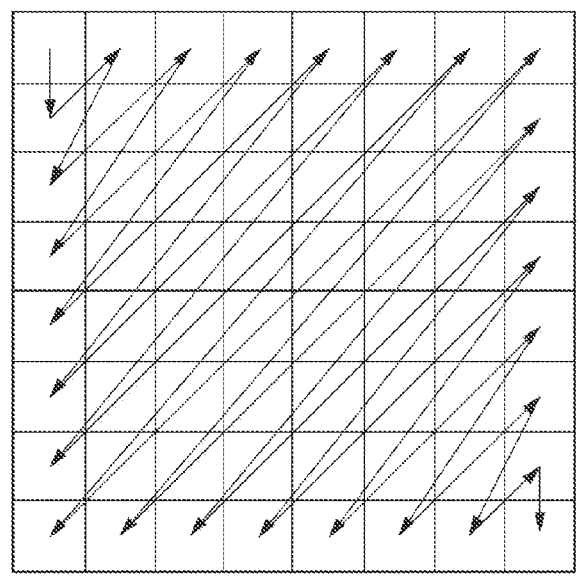
FIG. 18C illustrates an example of a scanning method of coefficients of a quantization matrix according to the seventh and the eighth exemplary embodiments.
Figure 20A:
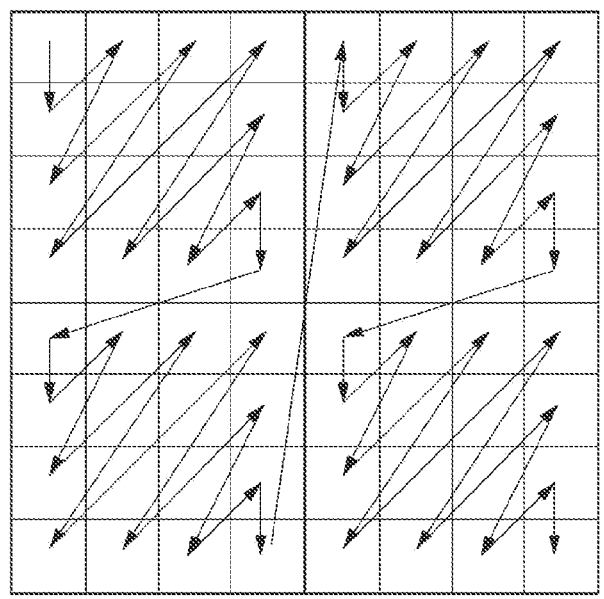
FIG. 20A illustrates an example of a scanning method of coefficients of a quantization matrix according to the seventh and the eighth exemplary embodiments.
Figure 20B:
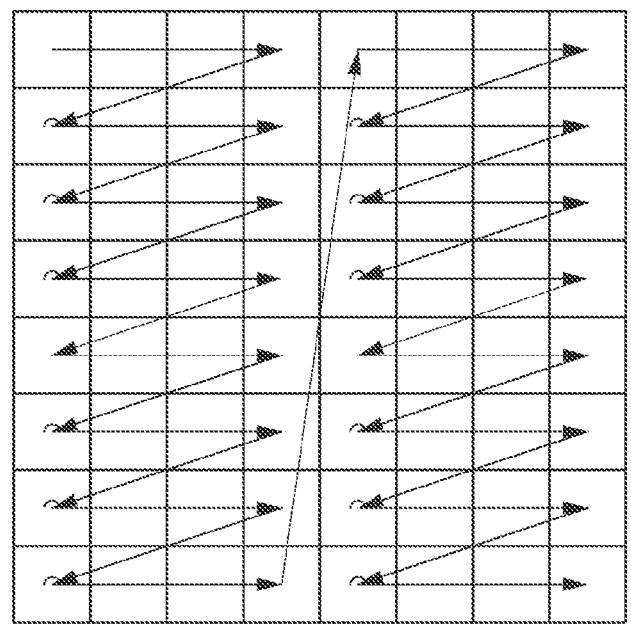
FIG. 20B illustrates an example of a scanning method of coefficients of a quantization matrix according to the seventh and the eighth exemplary embodiments.
Figure 20C:
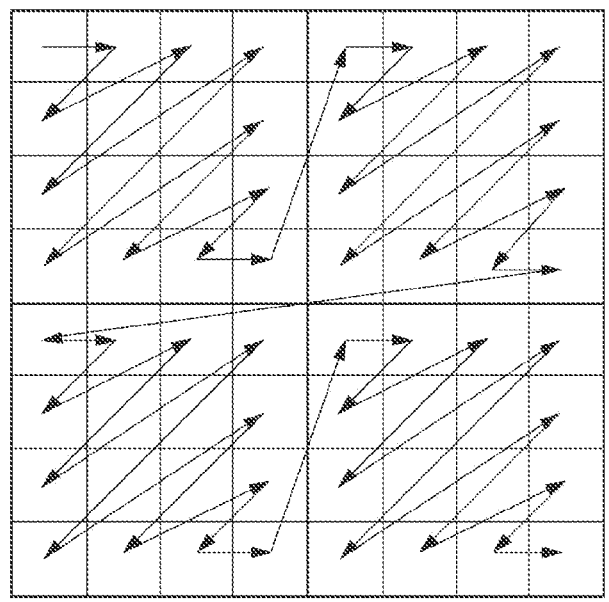
FIG. 20C illustrates an example of a scanning method of coefficients of a quantization matrix according to the seventh and the eighth exemplary embodiments.
Figure 20D:
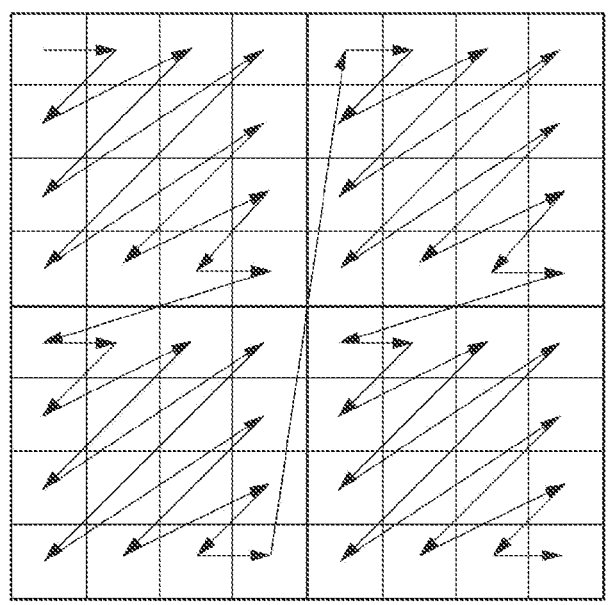
FIG. 20D illustrates an example of a scanning method of coefficients of a quantization matrix according to the seventh and the eighth exemplary embodiments.

According to the present embodiment, the diagonal unidirectional scanning illustrated in FIG. 18A is used and the difference between an element and its previous element is calculated for each element in the scanning order. However, the scanning method is not limited to such an example. For example, a diagonal unidirectional scanning illustrated in FIG. 18B can also be used alternatively. The scanning direction in FIG. 18B and the scanning direction in FIG. 18A are symmetric with respect to a diagonal line. In other words, any scanning method so long as it is a unidirectional scanning method can be used. Further, if a transformation block size of 8×8 pixels is additionally used in the present embodiment, a unidirectional scanning in the diagonal direction corresponding to the 8×8 pixels transformation block illustrated in FIG. 18C is used.

The flowchart of the image coding process according to the present embodiment is similar to the flowchart according to the first exemplary embodiment illustrated in FIG. 9 except for the operation in step S902. Since operations other than what is performed in step S902 are similar to those described in the first exemplary embodiment, their descriptions are not repeated.

In step S902, the quantization matrix scanning unit 109 scans the quantization matrices generated in step S901. Then, the difference of each element is calculated and difference matrices are generated. According to the present embodiment, the quantization matrix illustrated in FIG. 19A is scanned by the scanning method illustrated in FIG. 18A, and the difference matrix illustrated in FIG. 19B is generated. However, the quantization matrix and the scanning method are not limited to such examples.

According to the above-described configuration and operation, for a video coding method that uses diagonal scanning illustrated in FIG. 18A in place of the zigzag scanning illustrated in FIG. 13A to code quantization coefficients, a bit stream with similar or higher efficiency can be generated while saving memory used by sharing scanning method.

In recent years, JCT-VC (Joint Collaborative Team on Video Coding) has been created by experts from ISO/IEC and ITU-T to develop a new international video coding standard as a successor of H.264. According to the contribution JCTVC-J0150 submitted to JCT-VC, it is reported that equivalent or slightly improved efficiency is confirmed by employing a diagonal scanning method, which is equivalent to the method of the present embodiment, for the coding of the quantization matrices. Further, since zigzag scanning is not used in High Efficiency Video Coding (HEVC), which is under standardization in JCT-VC, a memory-saving effect by sharing the scanning method is also reported in the contribution.
<http://phenix.int-evry.fr/jct/doc_end_user/documents/10_Stockholm/wg11/>

Further, as illustrated in FIGS. 20A to 20D, if the quantization matrix is divided into a number of small matrices, the small matrices can be scanned by the unidirectional scanning. In this manner, the scanning method of the 4×4 quantization matrix can be applied to a quantization matrix of a larger size, and the memory necessary in storing the scanning order information can be reduced.

According to an eighth exemplary embodiment of the present invention, the image decoding apparatus has a configuration similar to the image decoding apparatus of the second exemplary embodiment illustrated in FIG. 2. However, the operation of the quantization matrix inverse scanning unit 208 is different. Since, the processing of the present embodiment is similar to that of the second exemplary embodiment except for the operation performed by the quantization matrix inverse scanning unit 208, the description of similar processing is not repeated. According to the present embodiment, decoding of the bit stream generated according to the seventh exemplary embodiment will be described.

The quantization matrix inverse scanning unit 208 performs an inverse operation of the quantization matrix scanning unit 109 according to the seventh exemplary embodiment. The difference matrices input to the quantization matrix inverse scanning unit 208 have each element of the quantization matrix calculated from each difference value. Then, the calculated elements are inversely scanned and two-dimensional quantization matrices are reproduced.

According to the present embodiment, each element of the quantization matrices is calculated from each difference value of the difference matrices, and the obtained element is inversely scanned using the scanning method illustrated in FIG. 18A to reproduce two-dimensional quantization matrices. The inverse scanning method is not limited to the method illustrated in FIG. 18A, and can be the diagonal unidirectional scanning illustrated in FIG. 18B alternatively. The scanning direction in FIG. 18B and the scanning direction in FIG. 18A are symmetric with respect to a diagonal line. In other words, any scanning method so long as it is a unidirectional scanning method can be used.

The flowchart of the image decoding processing according to the present embodiment is similar to the flowchart of the second exemplary embodiment illustrated in FIG. 10 except for the operation in step S1003. Thus, operations other than step S1003 are similar to those of the second exemplary embodiment and their descriptions are not repeated.

In step S1003, the quantization matrix inverse scanning unit 208 reproduces two-dimensional quantization matrices by calculating each element of the quantization matrices from the difference matrices generated in step S1002 and performing inverse scanning of each element. According to the present embodiment, each element of the quantization matrix is calculated from the difference matrix illustrated in FIG. 19B, and each calculated element is inversely scanned using the inverse scanning method illustrated in FIG. 18A. Consequently, the quantization matrix illustrated in FIG. 19A is reproduced. The difference matrix and the inverse scanning method are not limited to such examples.

According to the above-described configuration and operation, a reproduced image can be obtained by decoding a bit stream with similar or slightly better coding efficiency generated by seventh exemplary embodiment while saving memory used by sharing the scanning method.

According to the above-described exemplary embodiment, each processing unit illustrated in FIGS. 1 to 4 is realized by a hardware component. However, the processing performed by each processing unit illustrated in FIGS. 1 to 4 can be performed by a computer-executable program.

Figure 14:
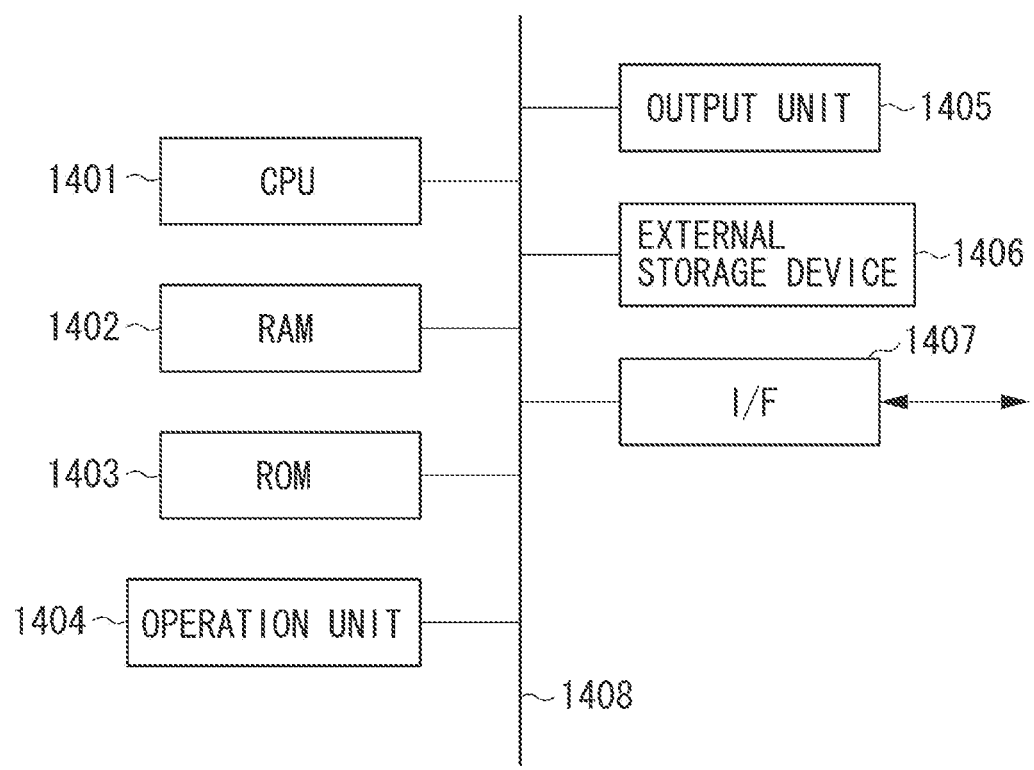
FIG. 14 is a block diagram illustrating a configuration example of hardware of a computer applicable to the image coding apparatus and the decoding apparatus according to exemplary embodiments of the present invention.

FIG. 14 is a block diagram illustrating an example of a hardware configuration of a computer which can be used for the image processing apparatus according to the above-described exemplary embodiments.

A central processing unit (CPU) 1401 controls the entire computer according to a computer program or data stored in a random access memory (RAM) 1402 or a read-only memory (ROM) 1403. Further, the CPU 1401 executes the above-described processing performed by the image processing apparatus according to the above-described exemplary embodiments. In other words, the CPU 1401 functions as each of the processing units illustrated in FIGS. 1 to 4.

The RAM 1402 includes an area used for temporarily storing a computer program or data loaded from an external storage device 1406 or data acquired externally via an interface (I/F) 1407. Further, the RAM 1402 includes a work area which is used when the CPU 1401 executes various types of processing. In other words, the RAM 1402 can be assigned as a frame memory or arbitrarily provide other various areas.

Setting data of the computer and programs such as a boot program are stored in the ROM 1403. An operation unit 1404 includes a keyboard or a mouse. By the user of the computer operating the operation unit 1404, various instructions are input to the CPU 1401. An output unit 1405 outputs the result of the processing executed by the CPU 1401. The output unit 1405 is, for example, a display device such as a liquid crystal display and is capable of displaying the processing result.

The external storage device 1406 is a large capacity information storage unit typified by a hard disk drive device. An operating system (OS) and a computer program, which is used when the CPU 1401 realizes the function of each unit illustrated in FIGS. 1 to 4, are stored in the external storage device 1406. Further, each image data as a processing object can be stored in the external storage device 1406.

The computer program or data stored in the external storage device 1406 is loaded into the RAM 1402 as appropriate according to the control of the CPU 1401 and processed by the CPU 1401. A network such as a local area network (LAN) or the Internet and other apparatus such as a projection apparatus or a display device can be connected to an I/F 1407, so that the computer can receive and transmit various pieces of information via the I/F 1407. A bus 1408 connects each of the above-described units.

The operation realized by the above-described configuration is performed mainly by the CPU 1401. The processing described with reference to the flowchart described above is controlled by the CPU 1401.

The present invention can be achieved when a storage medium storing code of a computer program that realizes the above-described function is supplied to the system and the system reads out and executes the code of the computer program. In this case, the program code read out from the storage medium itself realizes the function of the above-described exemplary embodiment, and the storage medium which stores the program code constitutes the present invention. Further, a case where an OS or the like, which runs on a computer, executes a part or whole of the actual processing based on an instruction of the program code so that a function of the above-described function is realized is also included in the present invention.

Furthermore, the present invention can be achieved by the following configuration. Specifically, the computer program code read out from the storage medium is written in a memory provided in a function expanding card inserted in a computer or a function expanding unit connected to the computer, and a CPU provided in the function expanding card or the function expanding unit performs the whole or a part of the actual processing based on an instruction from the computer program code to realize the functions of the above-described exemplary embodiment. The above-described configuration is also included in the present invention.

When the present invention is applied to the above-described storage medium, the code of the computer program corresponding to the flowchart described above is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An image coding apparatus comprising:
a quantization unit configured to quantize transform coefficients by using a quantization matrix, the quantization matrix being a matrix with n rows and n columns, n being a natural number equal to or greater than 4,
an acquisition unit configured to acquire difference values between elements among a plurality of elements in the quantization matrix, and
a coding unit configured to code the difference values acquired by the acquisition unit,
wherein the acquisition unit acquires a difference value between an element corresponding to a first row and a first column and a predetermined initial value, and
wherein the acquisition unit acquires a difference value between an element corresponding to the first row and a p-th column (p is a natural number equal to or greater than 2) in the quantization matrix and an element corresponding to a (p+1)th row and the first column in the quantization matrix.

2. The image coding apparatus according to claim 1, wherein the acquisition unit acquires a difference value between the element corresponding to the first row and the first column in the quantization matrix and an element corresponding to a second row and the first column, and acquires a difference value between the element corresponding to the second row and the first column in the quantization matrix and an element corresponding to the first row and a second column.

3. The image coding apparatus according to claim 1, wherein the number of rows in the quantization matrix is equal to the number of columns in the quantization matrix.

4. The image coding apparatus according to claim 1, wherein the acquisition unit acquires a difference value between an element corresponding to an (m+1)th row (m is a natural number equal to or greater than 1 and equal to or smaller than n) and an (m−1)th column in the quantization matrix and an element corresponding to an m-th row and an m-th column in the quantization matrix that is neither an element corresponding to the first column in the quantization matrix nor an element corresponding to an n-th row in the quantization matrix.

5. The image coding apparatus according to claim 1, further comprising a generation unit configured to generate header information indicating a size of the quantization matrix.

6. The image coding apparatus according to claim 1, wherein the acquisition unit acquires a difference value between the element corresponding to the first row and the second column in the quantization matrix and an element corresponding to a third row and the first column.

7. The image coding apparatus according to claim 1, wherein the quantization matrix is a matrix with n rows and n columns (n is a natural number), and
wherein the acquisition unit acquires a difference value between an element corresponding to a (p−1)th row and an n-th column in the quantization matrix and an element corresponding to an n-th row and the p-th column in the quantization matrix.

8. The image coding apparatus according to claim 1, wherein the quantization matrix is a matrix with n rows and n columns (n is a natural number), and
wherein the coding unit codes each difference value acquired by the acquisition unit in an order corresponding to a diagonal direction parallel with a direction connecting an element corresponding to the first row and an n-th column in the quantization matrix with an element corresponding to an n-th row and the first column in the quantization matrix.

9. The image coding apparatus according to claim 8, wherein, the coding unit codes the difference values acquired by the acquisition unit in an order corresponding to a diagonal direction extending from each element in the first column except for an element corresponding to the first row and the first column in the quantization matrix to an element corresponding to the first row, and
wherein the coding unit codes the difference value acquired by the acquisition unit in an order corresponding to a diagonal direction extending from each element in the n-th column except for an element corresponding to the n-th row and the n-th column in the quantization matrix to an element corresponding to the n-th row.

10. The image coding apparatus according to claim 1, further comprising:
 a prediction unit configured to perform prediction, for an image to be subjected to coding, to generate prediction errors;
 a transform unit configured to perform orthogonal transform on the prediction errors to generate transform coefficients; and
 wherein, the coding unit codes the quantized coefficients.

11. An image decoding apparatus for decoding a bit stream, the image decoding apparatus comprising:
 a decoding unit configured to decode coded data, included in the bit stream, corresponding to a plurality of difference values which is ordered, the difference values being difference values between elements in a quantization matrix used to derive transform coefficients from quantized coefficients, the quantization matrix being a matrix with n rows and n columns, n being a natural number equal to or greater than 4;
 an element derivation unit configured to derive a plurality of elements in a one-dimensional array from the plurality of difference values;
 an association unit configured to associate the elements in the one-dimensional array derived by the element derivation unit with an element in the quantization matrix, and
 a coefficient derivation unit configured to derive the transform coefficients from the quantized coefficients by using the quantization matrix;
 wherein the element derivation unit derives a first element by adding a first difference value in the plurality of difference values and a predetermined value, and derives an r-th element (r being a natural number equal to or greater than 2) by adding an r-th difference value in the plurality of difference values and an (r−1)th element in the one-dimensional array, and
 wherein the association unit associates a q-th element (q is a natural number) in the one-dimensional array with an element corresponding to a first row and a p-th column (p is a natural number equal to or greater than 2) in the quantization matrix, and associates a (q+1)th element in the one-dimensional array with an element corresponding to a (p+1)th row and a first column in the quantization matrix.

12. The image decoding apparatus according to claim 11, wherein the association unit associates the first element in the one-dimensional array with an element corresponding to the first row and the first column in the quantization matrix, associates a second element in the one-dimensional array with an element corresponding to a second row and the first column in the quantization matrix, and associates a third element in the one-dimensional array with an element corresponding to the first row and a second column in the quantization matrix.

13. The image decoding apparatus according to claim 11, wherein a number of rows in the quantization matrix is equal to a number of columns in the quantization matrix.

14. The image decoding apparatus according to claim 11, wherein the quantization matrix is a matrix with n rows and n columns (n is a natural number), and
 wherein the association unit associates an s-th (s is a natural number) element in the one-dimensional array, with an element corresponding to an m-th (m is a natural number) row and an m-th column in the quantization matrix, which is an element except for elements in the first column in the quantization matrix and elements in the n-th row in the quantization matrix, and associates an (s+1)th element in the one-dimensional array with an element corresponding to an (m−1)th row and an (m+1)th column in the quantization matrix.

15. The image decoding apparatus according to claim 11, wherein a size in the quantization matrix is based on information included in header information.

16. The image decoding apparatus according to claim 11, wherein the association unit associates a fourth element in the one-dimensional array with an element corresponding to a third row and the first column in the quantization matrix.

17. The image decoding apparatus according to claim 11, wherein the association unit associates a t-th element (t is a natural number) in the one-dimensional array with an element corresponding to a p-th row and an n-th column in the quantization matrix, and associates a (t+1)th element in the one-dimensional array with an element corresponding to an n-th row and a (p+1)th column in the quantization matrix.

18. The image decoding apparatus according to claim 11, wherein the quantization matrix is a matrix with n rows and n columns (n is a natural number), and
 wherein the association unit associates the plurality of elements in the one-dimensional array with elements in the quantization matrix in an order corresponding to a diagonal direction parallel to a direction connecting an element corresponding to the first row and an n-th column in the quantization matrix with an element corresponding to an n-th row and the first column.

19. The image decoding apparatus according to claim 18, wherein the association unit associates the plurality of elements in the one-dimensional array with the elements in the quantization matrix in an order corresponding to a diagonal direction extending from each element in the first column except for an element corresponding to the first row and the first column in the quantization matrix to an element corresponding to the first row and in an order corresponding to a diagonal direction extending from each element in the n-th column except for an element corresponding to the n-th row and the n-th column in the quantization matrix to an element corresponding to the n-th row.

20. The image decoding apparatus according to claim 11, further comprising:
 an inverse-transform unit configured to perform inverse-orthogonal transform on the transform coefficients to derive prediction errors; and
 a construction unit configured to perform prediction based on decoded pixels, to derive a prediction image, and construct an image on the basis of the prediction image and the prediction errors.

21. An image coding method comprising:
 quantizing transform coefficients by using a quantization matrix, the quantization matrix being a matrix with n rows and n columns, n being a natural number equal to or greater than 4,
 acquiring difference values between elements among a plurality of elements in the quantization matrix, and
 coding the difference values acquired,
 wherein a difference value is acquired between an element corresponding to a first row and a first column and a predetermined initial value, and
 wherein a difference value is acquired between an element corresponding to the first row and a p-th column (p is a natural number equal to or greater than 2) in the quantization matrix and an element corresponding to a (p+1)th row and the first column in the quantization matrix.

22. An image decoding method for decoding a bit stream, the image decoding method comprising:
decoding coded data, included in the bit stream, corresponding to a plurality of difference values which is ordered, the difference values being difference values between elements in a quantization matrix used to derive transform coefficients from quantized coefficients, the quantization matrix being a matrix with n rows and n columns, n being a natural number equal to or greater than 4;
deriving a plurality of elements in a one-dimensional array from the plurality of difference values;
associating the elements derived in the one-dimensional array with an element in the quantization matrix, and
deriving the transform coefficients from the quantized coefficients by using the quantization matrix;
wherein a first element is derived by adding a first difference value in the plurality of difference values and a predetermined value, and derives an r-th element (r being a natural number equal to or greater than 2) by adding an r-th difference value in the plurality of difference values and an (r−1)th element in the one-dimensional array, and
wherein a q-th element (q is a natural number) in the one-dimensional array is associated with an element corresponding to a first row and a p-th column (p is a natural number equal to or greater than 2) in the quantization matrix, and associates a (q+1)th element in the one-dimensional array, with an element corresponding to a (p+1)th row and a first column in the quantization matrix.

23. A non-transitory computer-readable medium having computer readable instructions stored thereon which when executed by a computer cause the computer to perform an image coding method comprising:
quantizing transform coefficients by using a quantization matrix, the quantization matrix being a matrix with n rows and n columns, n being a natural number equal to or greater than 4,
acquiring difference values between elements among a plurality of elements in the quantization matrix, and
coding the difference values acquired,
wherein a difference value is acquired between an element corresponding to a first row and a first column and a predetermined initial value, and
wherein a difference value is acquired between an element corresponding to the first row and a p-th column (p is a natural number equal to or greater than 2) in the quantization matrix and an element corresponding to a (p+1)th row and the first column in the quantization matrix.

24. A non-transitory computer-readable medium having computer readable instructions stored thereon which when executed by a computer cause the computer to perform an image decoding method for decoding a bit stream, the image decoding method comprising:
decoding coded data, included in the bit stream, corresponding to a plurality of difference values which is ordered, the difference values being difference values between elements in a quantization matrix used to derive transform coefficients from quantized coefficients, the quantization matrix being a matrix with n rows and n columns, n being a natural number equal to or greater than 4;
deriving a plurality of elements in a one-dimensional array from the plurality of difference values;
associating the elements derived in the one-dimensional array with an element in the quantization matrix, and
deriving the transform coefficients from the quantized coefficients by using the quantization matrix;
wherein a first element is derived by adding a first difference value in the plurality of difference values and a predetermined value, and derives an r-th element (r being a natural number equal to or greater than 2) by adding an r-th difference value in the plurality of difference values and an (r−1)th element in the one-dimensional array, and
wherein a q-th element (q is a natural number) in the one-dimensional array is associated with an element corresponding to a first row and a p-th column (p is a natural number equal to or greater than 2) in the quantization matrix, and associates a (q+1)th element in the one-dimensional array, with an element corresponding to a (p+1)th row and a first column in the quantization matrix.

* * * * *